(12) United States Patent
Thorpe et al.

(10) Patent No.: US 10,586,209 B2
(45) Date of Patent: *Mar. 10, 2020

(54) AUTOMATICALLY COLLECTING DATA REGARDING ASSETS OF A BUSINESS ENTITY

(75) Inventors: John Robert Thorpe, Sunnyvale, CA (US); Charles Larry Marker, II, Los Altos Hills, CA (US); Constantin Stelio Delivanis, Los Altos Hills, CA (US); Alistair D'Lougar Black, Los Gatos, CA (US)

(73) Assignee: BDNA Corporation, Itasca, IL (US)

( * ) Notice: Subject to any disclaimer, the term of this patent is extended or adjusted under 35 U.S.C. 154(b) by 1878 days.

This patent is subject to a terminal disclaimer.

(21) Appl. No.: 11/416,654

(22) Filed: May 2, 2006

(65) Prior Publication Data
US 2006/0248187 A1    Nov. 2, 2006

Related U.S. Application Data

(62) Division of application No. 10/125,998, filed on Apr. 18, 2002, now Pat. No. 7,089,306.

(51) Int. Cl.
*G06F 15/173*    (2006.01)
*G06F 15/167*    (2006.01)
*G06Q 10/10*    (2012.01)

(52) U.S. Cl.
CPC .................................... *G06Q 10/10* (2013.01)

(58) Field of Classification Search
CPC ........ G06Q 10/10; G06Q 30/60; G06Q 50/26; G06Q 10/087
(Continued)

(56) References Cited

U.S. PATENT DOCUMENTS 5,805,819 A    9/1998 Chin et al.
5,887,140 A    3/1999 Itsumi et al.
(Continued)

FOREIGN PATENT DOCUMENTS

WO    WO-0225438 A1 *  3/2002 ............... G06F 8/62
WO    WO 2018/191294    10/2018

OTHER PUBLICATIONS

U.S. Appl. No. 10/125,998 Office Action dated Jun. 29, 2005.
(Continued)

*Primary Examiner* — Ario Etienne
*Assistant Examiner* — Sahera Halim
(74) *Attorney, Agent, or Firm* — Knobbe, Martens, Olson & Bear, LLP

(57) ABSTRACT

A system to automatically gather attribute data about elements such as networks, network interface cards, operating systems, device types, installed software, processes in execution, financial data, etc. in an organization or a designated subset of the organization. Fingerprint files are used, each fingerprint file corresponding to an element of a specific type and each containing a list of attributes that will be found if that element exists in the system. Each fingerprint contains or points to one or more collection instructions which control a data collector process to attempt to gather attribute data. Each fingerprint contains or points to rules that are used to analyze the attribute data gathered to calculate the probability that the element exists. The rules can be fired sequentially, in if-then-else fashion or can be incorporated in a script in loops and with mathematical manipulations, tests and branching for more sophisticated analysis. Fingerprints can be turned on and off by configuration data and can be used in a logical order to do discovery without any prior knowledge of the systems being analyzed. A refresh schedule and collection calendar control how often (Continued)

the fingerprints are used in some embodiments, and collected data is stored with time stamps to enable analysis of changes in the data over time.

15 Claims, 20 Drawing Sheets

(58) Field of Classification Search
USPC ......... 709/220, 203, 223–225, 227–229, 250
See application file for complete search history.

(56) References Cited

U.S. PATENT DOCUMENTS

| | | | |
|---|---|---|---|
| 6,189,032 B1 | 2/2001 | Susaki et al. | |
| 6,336,138 B1 | 1/2002 | Caswell et al. | |
| 6,347,336 B1 | 2/2002 | Song et al. | |
| 6,487,659 B1 | 11/2002 | Kigo et al. | |
| 6,574,662 B2 | 6/2003 | Sugiyama et al. | |
| 6,633,834 B2 | 10/2003 | Conrad et al. | |
| 6,633,977 B1* | 10/2003 | Hamilton, II | H04L 41/0853 713/100 |
| 6,636,973 B1 | 10/2003 | Novoa et al. | |
| 6,691,067 B1* | 2/2004 | Ding | G06F 11/3447 702/186 |
| 6,834,304 B1 | 12/2004 | Nisbet et al. | |
| 6,845,393 B1 | 1/2005 | Murphy et al. | |
| 6,871,230 B1 | 3/2005 | Fukunaga et al. | |
| 6,920,492 B2 | 7/2005 | Richard | |
| 6,988,134 B2* | 1/2006 | Thorpe et al. | 709/223 |
| 7,089,306 B2* | 8/2006 | Thorpe et al. | 709/224 |
| 7,216,360 B2* | 5/2007 | Nakao | G06F 21/84 726/5 |
| 7,493,388 B2 | 2/2009 | Wen et al. | |
| 7,720,950 B2 | 5/2010 | Joanovic et al. | |
| 8,051,298 B1 | 11/2011 | Burr et al. | |
| 8,874,621 B1 | 10/2014 | Goodwin et al. | |
| 8,924,302 B2 | 12/2014 | Bisbee et al. | |
| 2001/0029474 A1* | 10/2001 | Yada | G06Q 10/06 705/28 |
| 2002/0066077 A1* | 5/2002 | Leung | G06F 11/368 717/126 |
| 2002/0169696 A1* | 11/2002 | Zara | G06Q 10/06 705/28 |
| 2003/0014332 A1 | 1/2003 | Gramling | |
| 2003/0055749 A1 | 3/2003 | Carmody et al. | |
| 2003/0061232 A1* | 3/2003 | Patterson | G06F 17/30861 |
| 2003/0101108 A1 | 5/2003 | Botham et al. | |
| 2003/0154199 A1 | 8/2003 | Thomas et al. | |
| 2003/0200294 A1 | 10/2003 | Thorpe et al. | |
| 2003/0200304 A1 | 10/2003 | Thorpe et al. | |
| 2004/0024662 A1 | 2/2004 | Gray et al. | |
| 2004/0122931 A1 | 6/2004 | Rowland et al. | |
| 2005/0033833 A1 | 2/2005 | Baldiga et al. | |
| 2005/0256973 A1 | 11/2005 | Holtz et al. | |
| 2006/0059262 A1 | 3/2006 | Adkinson et al. | |
| 2006/0129415 A1* | 6/2006 | Thukral | G06Q 10/087 705/28 |
| 2006/0248187 A1 | 11/2006 | Thorpe et al. | |
| 2007/0190609 A1 | 8/2007 | Black et al. | |
| 2008/0172583 A1 | 7/2008 | Mahajan et al. | |
| 2010/0293543 A1 | 11/2010 | Erhard | |
| 2011/0218920 A1 | 9/2011 | Agrawal et al. | |
| 2013/0225243 A1 | 8/2013 | Matthews | |
| 2014/0229920 A1 | 8/2014 | Rossi | |
| 2016/0132684 A1 | 5/2016 | Barbas | |
| 2018/0075560 A1 | 3/2018 | Thukral | |
| 2018/0075561 A1 | 3/2018 | Thukral | |
| 2018/0295494 A1 | 10/2018 | Meau | |

OTHER PUBLICATIONS

Gupta, Sanchika, et al.; "A fingerprinting system calls approach for intrusion detection in a cloud environment", Computational aspects of social networks (CASoN), 2012 fourth international conference on. IEEE, 2012. pp. 309-314 (Year: 2012).

Kim, Gene H., and Eugene H. Spafford. "The design and implementation of tripwire: A file system integrity checker." Proceedings of the 2nd ACM Conference on Computer and Communications Security. ACM, 1994.pp. 18-29 (Year: 1994).

Mohammadzadeh, Hamid, Masood Mansoori, and Ian Welch. "Evaluation of fingerprinting techniques and a windows-based dynamic honeypot." Proceedings of the Eleventh Australasin Information Security Conference—vol. 138. Australian Computer Society, Inc., 2013.pp.59-66 (Year: 2013).

U.S. Appl. No. 11/011,890 Final Office Action dated Sep. 6, 2018.
U.S. Appl. No. 15/706,526 Office Action dated Oct. 3, 2018.
PCT Application No. PCT/US2018/026947 International Search Report and Written Opinion dated Jun. 28, 2018.
U.S. Appl. No. 11/011,890 Office Action dated Feb. 22, 2018.
U.S. Appl. No. 11/416,654 Final Office Action dated Jan. 25, 2018.
U.S. Appl. No. 11/416,654 Final Office Action dated Apr. 20, 2017.
U.S. Appl. No. 11/416,654 Office Action dated Dec. 23, 2009.
U.S. Appl. No. 11/416,654 Office Action dated May 26, 2017.
PCT Application No. PCT/US2018/051386 International Search Report and Written Opinion dated Nov. 14, 2018.

* cited by examiner

ELEMENT / ATTRIBUTE DEF. & CATALOGUE

|   | PARENT OR GRANDPARENT | CHILD OR GRANDCHILD |
|---|---|---|
| 1) | UNIX SERVER | UNIX FILE SYSTEM |
| 2) | UNIX SERVER | UNIX MAINTENANCE AGREEMENT |
| 3) | UNIX FILE SYSTEM | FILE TYPE 1 |
| 4) | UNIX SERVER | FILE TYPE 1 |

CONTAINMENT TABLE

FIG. 3

| UNIX SERVER AVAILABLE BANDWIDTH TIME 1 | UNIX SERVER AVAILABLE DISK SPACE TIME 1 | UNIX SERVER MAXIMUM AVAILABLE DISK SPACE |
|---|---|---|
| UNIX SERVER AVAILABLE BANDWIDTH TIME 2 | UNIX SERVER AVAILABLE DISK SPACE TIME 2 | |
| ⋮ | ⋮ | |

USER DEFINED CORRELATION TABLE

FIG. 4

| | UNIX SERVER AVAILABLE BANDWIDTH INTEGER/4/MFLOPS | UNIX SERVER CPU SPEED INT./4/MHz | TERMINATION DATE STRING MM/DD/YYYY | ... | UNIX SERVER AVAILABLE DISK SPACE INT/5/MB | ... |
|---|---|---|---|---|---|---|
| SEMANTICS & FORMAT 48 | | | | | | |
| ACTUAL DATA INSTANCES ↓ | FIRST REFRESH ATTRIBUTE DATA TIME 1 | FIRST REFRESH ATTR. DATA | FIRST REFR. ATTR. DATA | | FIRST REFRESH ATTR. DATA TIME 1 | |
| | SECOND REFRESH ATTRIBUTE DATA TIME 2 | SECOND REFRESH ATTR. DATA | ⋮ | | " TIME 2 | |
| | ⋮ | ⋮ | | | ⋮ | |

COLLECTED DATA TABLE

FIG. 5

CPU COLLECTION
ELEMENT TREE
NAME (ID, TYPEID) [ATTR. = VALUE] ←— 125

TYPES (1) ←— 101
  OS (2) [TYPE, HOSTNAME]
  USER (3) [NAME, PASSWORD]
  SUPERUSER (4,3) [NAME, PASSWORD]
  FILE (5) [NAME, SIZE] ←— 121
    UNIX (10,5) [NAME, SIZE, OWNER] ←— 123
    WINDOWS (11,5) [NAME, SIZE, ARCHIVE]
  MEMORY (6) [SIZE, %USED]
  CPU (7) [CHIPID, TYPE, SPEED, %USED]
  PROCESS (8) [NAME]
  HTTP (9) [PORT, RESPONSE, TYPE, #PROCESSES]
FINGERPRINT (100) ←— 103
  NETWORK (101) [NETWORK, MASK, BOTTOMIP, TOPIP] ←— 107
  NIC (102) [ADDRESS, RESPONSE] ←— 109
  SOLARIS 2.7 (103,2) [TYPE, HOSTNAME] ←— 111
    HTTP (104,9) [PORT, RESPONSE, TYPE, #PROCESSES] ←— 113
    SUPERUSER (105,4) [NAME, PASSWORD] ←— 115
    MEMORY (106,6) [SIZE, %USED] ←— 117
    CPU (107,7) [CHIPID, TYPE, SPEED, %USED] ←— 119
    HTTP (108,5) [NAME] ←— 131
DATA (1000) ←— 105
  1.1.1.0(1001,101) [NETWORK=1.1.1.0, MASK=255.255.255.0, BOTTOMIP=1.1.1.2, TOPIP=1.1.1.254] ←— 127
  1.1.1.20 (1002,102) [ADDRESS = 1.1.1.20, RESPONSE = 25MS] ←— 129
  SOLARIS 2.7 (1003,103) [TYPE = SOLARIS 2.7, HOSTNAME = SUN01] ←— 131
    HTTP (1004,104)[PORT = 80, RESPONSE = <HTML..., TYPE = APACHE 1.3, #PROCESSES = 10] ←— 133
    SUPERUSER (1005,105) [NAME = ROOT, PASSWORD = #######] ←— 135
    MEMORY (1006,106) [SIZE = 512, %USED = 55] ←— 137
    CPU (1007,107)[CHIPID = SPARC01, SPARC02,TYPE = SPARC, SPEED = 880,950, %USED = 75,45]

FIG. 7

| ELEMENTS | | | | |
|---|---|---|---|---|
| ID | NAME | TYPEID | COLLECTORID | REFRESH |
| 0 | ROOT | | | |
| 1 | TYPES | | | |
| 2 | OS | | | |
| 3 | USER | 3 | | |
| 4 | SUPERUSER | | | |
| 5 | FILE | | | |
| 6 | MEMORY | | | |
| 7 | CPU | | | |
| 8 | PROCESS | | | |
| 9 | HTTP | | | |
| 10 | UNIX | 5 | 206 | |
| 11 | WINDOWS | 5 | 207 | |
| 100 | FINGERPRINT | | | |
| 101 | NETWORK | | | |
| 102 | NIC | | | |
| 103 | SOLARIS 2.7 | 2 | | |
| 104 | HTTP | 9 | | |
| 105 | SUPERUSER | 4 | | |
| 106 | MEMORY | 6 | 216 | |
| 107 | CPU | 7 | 217 | |
| 108 | HTTPD | 8 | | |
| 1000 | DATA | | | |
| 1001 | 1.1.1.0 | 101 | | |
| 1002 | 1.1.1.20 | 102 | | |
| 1003 | SOLARIS 2.7 | 103 | | |
| 1004 | HTTP | 104 | | |
| 1005 | SUPERUSER | 105 | | |
| 1006 | MEMORY | 106 | | |
| 1007 | CPU | 107 | | |

FIG. 8

| ATTRIBUTES | | | |
|---|---|---|---|
| ID | NAME | COLNAME | DATATYPE |
| 49 | TYPE | A1 | STRING |
| 50 | HOSTNAME | A2 | STRING |
| 51 | NAME | A1 | STRING |
| 52 | PASSWORD | A2 | ENCRYPTED |
| 53 | NAME | A1 | STRING |
| 54 | SIZE | A2 | NUMBER |
| 55 | SIZE | A1 | NUMBER |
| 56 | %USED | A2 | NUMBER |
| 57 | CHIPID | A1 | STRING |
| 58 | TYPE | A2 | STRING |
| 59 | SPEED | A3 | NUMBER |
| 60 | %USED | A4 | NUMBER |
| 61 | NAME | A1 | STRING |
| 62 | PORT | A1 | NUMBER |
| 63 | RESPONSE | A2 | STRING |
| 64 | TYPE | A3 | STRING |
| 65 | #PROCESSES | A4 | NUMBER |
| 66 | OWNER | A3 | STRING |
| 67 | ARCHIVE | A4 | STRING |
| 68 | NETWORK | A1 | STRING |
| 69 | MASK | A2 | STRING |
| 70 | BOTTOMIP | A3 | STRING |
| 71 | TOPIP | A4 | STRING |
| 72 | ADDRESS | A1 | STRING |
| 73 | RESPONSE | A2 | STRING |

FIG. 9

MAPPING TABLE

| ELEMENT ATTRIBUTES ||||
|---|---|---|---|
| ELEMENTID | ATTRID | COLLECTORID | REFRESH |
| 2 | 49 | | |
| 2 | 50 | 214 | |
| 3 | 51 | | |
| 3 | 52 | | |
| 4 | 51 | 201 | |
| 4 | 52 | 202 | |
| 5 | 53 | | |
| 5 | 54 | | |
| 6 | 55 | | |
| 6 | 56 | | |
| 7 | 57 | | |
| 7 | 58 | | |
| 7 | 59 | | |
| 7 | 60 | | |
| 8 | 61 | | |
| 9 | 62 | 203 | |
| 9 | 63 | 204 | |
| 9 | 64 | | |
| 9 | 65 | 205 | |
| 10 | 53 | | |
| 10 | 54 | | |
| 10 | 66 | | |
| 11 | 53 | | |
| 11 | 54 | | |
| 11 | 67 | | |
| → 101 | 68 | (208) | |
| → 101 | 69 | (209) | |
| → 101 | 70 | (210) | |
| → 101 | 71 | (211) | |
| 102 | 72 | 212 | |
| 102 | 73 | 213 | |
| 103 | 49 | 200 | |
| 103 | 50 | | |
| 104 | 62 | | |
| 104 | 63 | | |
| 104 | 64 | 215 | |
| 104 | 65 | | |
| 105 | 51 | | |
| 105 | 52 | | |
| 106 | 55 | | |
| 106 | 56 | | |
| 107 | 57 | | |

FIG. 10A

| | | | |
|---|---|---|---|
| 107 | 58 | | |
| 107 | 59 | | |
| 107 | 60 | | |

| CHILDREN | |
|---|---|
| ELEMENTID | CHILDELEMENTID |
| 0 | 1 |
| 1 | 2 |
| 1 | 3 |
| 1 | 4 |
| 1 | 5 |
| 1 | 6 |
| 1 | 7 |
| 1 | 8 |
| 1 | 9 |
| 1 | 10 |
| 1 | 11 |
| 5 | 100 |
| 5 | 101 |
| 0 | 102 |
| 100 | 103 |
| 101 | 104 |
| 102 | 105 |
| 103 | 106 |
| 103 | 107 |
| 103 | 108 |
| 0 | 1000 |
| 1000 | 1001 |
| 1001 | 1002 |
| 1002 | 1003 |
| 1003 | 1004 |
| 1003 | 1005 |
| 1003 | 1006 |
| 1003 | 1007 |

FIG. 12

| | | FINGERPRINTS | | |
|---|---|---|---|---|
| ELEMENTID | SEQ | RULE | TRUEWEIGHT | FALSEWEIGHT |
| 101 | 1 | NET.ISVALIDNET($THIS.NETWORK)=TRUE | 100 | 0 |
| 101 | 2 | NET.ISVALIDMASK($THIS.MASK)=TRUE | 100 | 0 |
| 102 | 1 | $RESPONSE != "NO REPLY" | 100 | 0 |
| 103 | 1 | $OS.TYPE = "SUN SOLARIS 2.7" | 100 | 0 |
| 104 | 1 | HTTP.RESPONSE != "" | 100 | 0 |

FIG. 13

| | | COLLECTORS | |
|---|---|---|---|
| ID | SEQ | METHOD | STATEMENT |
| 200 | 1 | QUESO | $ADDRESS 22 |
| 201 | 1 | DEFAULT | ROOT |
| 202 | 1 | EMAIL | TO: ROOT@$ADDRESS |
| 202 | 2 | EMAIL | SUBJECT: ROOT USER PASSWORD |
| 203 | 1 | DEFAULT | 80 |
| 204 | 1 | HTTP | PORT $THIS.PORT |
| 204 | 2 | HTTP | GET / HTTP1.1 |
| 205 | 1 | EXPR | $HTTPD.LENGTH |
| 206 | 1 | SSH | IS -l $THIS.NAME | AWK... |
| 207 | 1 | SMB | DIR $THIS.NAME... |
| 208 | 1 | CONFIG | TEXTBOX |
| 209 | 1 | CONFIG | TEXTBOX(255.255.255.0) |
| 210 | 1 | EXPR | NET.GETBOTTOMIP($THIS.NETWORK, $THIS.MASK) |
| 211 | 1 | EXPR | NET.GETTOPIP($THIS.NETWORK, $THIS.MASK) |
| 212 | 1 | DISCOVERY | |
| 213 | 1 | PING | PING $THIS.ADDRESS | AWK... |
| 214 | 1 | DNS | LOOKUP $ADDRESS |
| 215 | 1 | SSH | PS -AEF | AWK HTTPD... |
| 216 | 1 | SSH | VMSTAT | GREP... |
| 217 | 1 | SSH | SAR... |

| DATA | | | | | |
|---|---|---|---|---|---|
| ELEMENTID | TIMESTAMP | ATTR1 | ATTR2 | ATTR3 | ATTR4 |
| 1001 | 40 | 1.1.1.0 | 255.255.255.0 | | |
| 1001 | 50 | 1.1.1.0 | 255.255.255.0 | 1.1.1.2 | 1.1.1.254 |
| 1002 | 50 | 1.1.1.20 | 25MS | | |
| 1003 | 60 | SOLARIS 2.7 | SUN01 | | |
| 1004 | 80 | 80 | <HTML... | | |
| 1005 | 90 | ROOT | ######## | | |
| 1006 | 100 | 512 | 55 | | |
| 1007 | 110 | SPARC01 | SPARC | 880 | 75 |
| 1007 | 110 | SPARC02 | SPARC | 950 | 45 |
| 1004 | 100 | 80 | <HTML... | APACHE 1.3 | 10 |

FIG. 14

PROCESS FOR AUTOMATED DISCOVERY OF ASSETS STARTING WITH
NO KNOWLEDGE OF THE EXISTENCE OF ANY NETWORKS, SERVERS
OR THE OPERATING SYSTEMS THEREOF

*134* — START WITH A FINGERPRINT FOR ONE TYPE OF NETWORK THAT MAY EXIST AND EXECUTE A COLLECTION INSTRUCTION PROCESS DESIGNED TO AUTOMATICALLY COLLECT ATTRIBUTE DATA ABOUT A NETWORK OF THAT TYPE AND COLLECT ATTRIBUTE DATA. THE COLLECTION INSTRUCTION MAY BE CONTAINED IN THE FINGERPRINT DATA STRUCTURE ITSELF, OR POINTED TO BY A POINTER IN THE FINGERPRINT. IN AN ALTERNATIVE EMBODIMENT, THE EXISTENCE OF THE NETWORKS AND THEIR ATTRIBUTES MAY BE ENTERED MANUALLY IN THE COLLECTED DATA TABLE.

*136* — APPLY ONE OR MORE NETWORK FINGERPRINT RULES POINTED TO BY THE NETWORK FINGERPRINT BEING USED TO PROCESS THE GATHERED ATTRIBUTE DATA TO DETERMINE THE PROBABILITY THAT A NETWORK OF THE TYPE DEFINED BY THE NETWORK FINGERPRINT IN USE EXISTS. MAKE A NETWORK INSTANCE ENTRY REGARDING THE NETWORK AND THE PROBABILITY OF THE EXISTENCE OF THE NETWORK IN A COLLECTED DATA TABLE AND RECORD ANY COLLECTED ATTRIBUTE DATA INCLUDING THE BOTTOM AND TOP NETWORK ADDRESSES.

*138* — REPEAT THE PROCESSING OF STEPS 134 AND 136 FOR EVERY OTHER AVAILABLE NETWORK FINGERPRINT

*140* — FOR A FIRST OF THE NETWORKS FOUND IN STEPS 134, 136 AND 138, SELECT A FIRST NETWORK INTERFACE CARD (NIC) FINGERPRINT FROM THE NETWORK INTERFACE CARD FINGERPRINTS AVAILABLE, AND EXECUTE A COLLECTION INSTRUCTION(S) CONTAINED IN THE FINGERPRINT OR POINTED TO THEREBY FOR EACH NETWORK ADDRESS OF THE SELECTED NETWORK TO ATTEMPT TO CONTACT A NIC AT EACH ADDRESS ON SAID NETWORK AND COLLECT ATTRIBUTE DATA THEREOF.

AUTOMATICALLY COLLECTING DATA REGARDING ASSETS OF A BUSINESS ENTITY

BACKGROUND OF THE INVENTION

Business organizations, and large companies and governments in particular have a need to have up-to-date information regarding the equipment that exist in an organization, the programs that are installed on these devices, which programs are actually in execution at any particular time. In addition, other data, such as financial information is needed to understand characteristics such as costs being incurred by the organization by virtue of the existence and use of various assets. Thus, management usually is interested in knowing costs to run a particular type of server. Management usually wants to know what leases exist and what their terms are. Management often also wants to know which software licenses exist and the terms of those licenses such as how many copies of the program are licensed and costs for use of the licensed software versus that actual number of copies of the licensed software the organization is actually using and how frequently the program is being used. There are a myriad of other issues management is interested in knowing about an organization and a myriad of different ways in which this information must be gathered.

This information is important to management to enable it to make better decisions regarding managing the business entity. Prior to the invention, most of the various types of information of interest had to be gathered manually which made it subject to errors and not always completely up-to-date. In addition, this manual effort represents overhead burden on the labor resource available to the corporation in performing work which is not directly related to producing products or services for sale. As such, it represents a drain on the assets of the organization.

It is useful to have a management tool which is able to automatically gather information about any business organization. It is also useful for such a tool to be able to gather all or most of the needed information without having any particular foreknowledge about the types of computers, operating systems and installed programs that the organization has.

In order to automatically gather information accurately regarding which application programs are installed on a computer, it is necessary to know which file names and file types and which dynamic linked libraries, etc. will be present if a particular application program is fully installed on a computer. This information must be known for every possible application program (or at least the ones which are to be automatically detected by the computer) and version thereof.

In order to determine what type of computing devices exist at each network address and other information about the machine, the proper queries that may be made to the operating system running on the machine to return information about the computer on which the operating system is running must be known. Frequently, the type of operating system running on each machine in all or a designated subset of networks of a large organization is not precisely known.

A prior art tool exists which allows automatic detection of the type of operating system which exists on a computer at a particular network address, but this tool cannot detect what type of computer the operating system is running on, the CPU speed, the chip set in use, or the mounted file system, the files thereof which are accessible or the application programs which are installed. The way this prior art tool works is to send a specific type of network packet to the unknown machine at the network address. This network packet has an undefined response packet. Each operating system deals with arrival of such a packet differently. By examining the response packet, the prior art tool determines which type of operating system is operating on the unknown machine.

However, to gather all the information needed by the financial officers and managers of a company today requires people to report every time a new machine is purchased, a new license is signed, a new lease or maintenance agreement is signed, new software is installed etc. Given the fact that people in the organization are busy trying to do their other jobs and make sure their systems do not fail, this type of manual reporting system soon fails and becomes out of date. Further, when there is turnover, the new employee does not know where the last employee left off in the reporting process.

No current system of which the inventive entity is aware has the ability to automatically determine the types of machines and operating systems that an organization has installed, the software that is installed on these machines, extract key terms from licenses, maintenance agreements, financial documents, etc. and automatically gather any other type of data that leaves a mark on a company. Specifically, no prior art system can detect: which operating system is installed on each computer in an organization; the type of computer and other information about the computer such as the mounted file system, chip set, available files, network cards installed; which software programs are installed on each computer and which processes are running on the computer; and, use predefined data collection procedures to collect financial and other types of data, and then encode all the gathered information in a data structure which can be mined for information by management.

Other prior art systems exist which monitor and/or control the use or performance of software on machines in a user's organization such as the systems offered by Globetrotter. In these systems, computers in the network of a user have known software applications installed on them. These agent programs are installed on these computers which monitor which programs are running and report launches to a licensing server for purposes of obtaining an authorization for the launch. The licensing server sends back an authorization or denial message, and the agent either lets the launch proceed or kills the application. These type systems were formerly offered by Wyatt River Software and Rainbow and similar systems were offered by Globetrotter. Other systems utilize agents which gather information about utilization of a computer's resources and report that information to a central server which stores it and uses it for analysis or billing purposes. Systems for monitoring the utilization of assets in a company are offered by Computer Associates as the Unicenter product, BMC Patrol, HP OpenView, Tivoli, etc.

None of these type prior art systems can automatically identify what types of assets the company has or extract key provisions of financial documents, leases, licenses, etc.

Therefore, a need has arisen for a system which can automatically determine the resources, i.e., computers, operating systems, application programs, that are installed on the networks of a company and automatically gather financial information such as costs, the existence and terms of leases, licenses, etc. A tool is needed to evaluate, encode, and store the gathered information in a data structure which can be used by management to get an accurate, up-to-date picture of the make-up of a business organization at any point in time to enable better management decision making.

SUMMARY OF THE INVENTION

A system within the genus of the invention provides method and apparatus to collect information of different types that characterize a business entity and consolidate all these different types of information about the hardware, software and financial aspects of the entity in a single logical data store. The data store and the data collection system will have three characteristics that allow the overall system to scale well among the plethora of disparate data sources.

The first of these characteristics that all species within the genus will share is a common way to describe all information as element/attributes structures. Specifically, the generic way to describe all information creates a different element/attribute data structure for each different type of information, e.g., server, software application program, software license. Each element in an element/attribute data structure contains a definition of the data type and length of a field to be filled in with the name of the asset to which the element corresponds. Each element/attribute data structure has one or more definitions of attributes peculiar to that type element. These definitions include the semantics for what the attribute is and the type and length of data that can fill in the attribute field. For example, a server element will have attributes such as the CPU server type, CPU speed, memory size, files present in the mounted file system, file system mounted, etc. The definitions of each of these attributes includes a definition of what the attribute means about the element (the semantics) and rules regarding what type of data (floating point, integer, string, etc.) that can fill in the attribute field and how long the field is. Thus, all attribute instances of the same type of a particular element that require floating point numbers for their expression will be stored in a common floating point format so programs using that attribute instance data can be simpler in not having to deal with variations in expression of the data of the same attribute. In some embodiments, all attribute data that needs to be expressed as a floating point number is expressed in the same format. The invention does not force all data sources to conform to it. Whatever format the data source provides the attribute data in, that data will be post processed to conform its expression in the collected data store to the definition for that attribute in the element/attribute data structure in terms of data type, data field length and units of measure.

A license type element will have attributes such as the license term in years or months, whether the license is worldwide or for a lesser territory, price, etc.

The second characteristic that all species within the genus will share is provision of a generic way to retrieve attribute data regardless of the element and the type of attribute to be received. This is done by including in each attribute definition in an element/attribute data structure a pointer to one or more "collection instructions". In some embodiments, the collection instruction for each attribute type is included in the attribute definition itself. These "collection instructions" detail how to collect an instance of that particular attribute from a particular data source such as a particular server type, a particular operating system, a particular individual (some collection instructions specify sending e-mail messages to particular individuals requesting a reply including specified information). More specifically, each attribute of each element, regardless of whether the element is a server, a lease, a maintenance agreement, etc., has a set of collection instructions. These collection instructions control data collectors to carry out whatever steps are necessary to collect an attribute of that type from whatever data source needs to be contacted to collect the data. The collection instructions also may access a collection adapter which is a code library used by the collector to access data using a specific access protocol.

The definition of each attribute in the element/attributes data structure may include a pointer to a "collection instruction". The collection instruction is a detailed list of instructions that is specific to the data source and access protocol from which the attribute data is to be received and defines the sequence of steps and protocols that must be taken to retrieve the data of this particular attribute. Each time this "collection instruction" is executed, an instance of that attribute will be retrieved and stored in the collection data store. This instance will be post-processed to put the data into the predefined format for this attribute and stored in the collected data structure in a common data store at a location therein which is designated to store instance of this particular attribute.

As an example of a collection instruction, suppose CPU speed on a UNIX server element is the desired attribute to collect. For UNIX servers, there is a known instruction that can be given to a UNIX server to cause it to retrieve the CPU speed. Therefore the "collection instruction" to collect the CPU speed for a UNIX server element will be a logical description or computer program that controls the collection gateway to, across a protocol described by the collection instructions, give the UNIX server the predetermined instructions or invoke the appropriate function call of an application programmatic interface provided by UNIX servers of this type to request the server to report its CPU speed. The reported CPU speed would be received from the collection gateway and stored in the collected data table.

Another example of a "collection instruction" on how to collect data for a particular type of attribute would be as follows. Suppose the attribute data needed was the name of the database administrator for an Oracle database. The "collection instruction" for collection of this attribute would be a program that controls the collection gateway to send an email message addressed to a particular person asking that person to send a reply email giving the name of the Oracle database administrator. The program would then scan returning emails for a reply from this person and extract the name of the database administrator from the email and put it in the collected data table. Typically, the email would have a fixed format known to the definition program such that the definition program would know exactly where in the email reply the Oracle database administrator's name would appear. A "collection instruction" to extract the maintenance costs attribute of a software license type element typically would be a definition or code that controls the data collector program to access a particular license file, read file looking for a particular field or alphanumeric string with a semantic definition indicating it was the maintenance cost and extract the maintenance cost and put that data into the data store.

The third characteristic that all species within the genus of the invention share is that information of all different types collected by the agent programs using the definitions is stored in a single common physical data store after post processing to conform the data of each attribute to the data type and field length in the attribute definition for that attribute of that element/attribute data structure. The element/attribute descriptions, containment or system-subsystem relationships between different element/attributes and collected data all are stored in one or more unique data structures in a common data store. By post processing to insure that all attribute data is conformed to the data type and field length in the element/attribute definition, correlations between data of different types is made possible since the format of data of each type is known and can be dealt with regardless of the source from which the data was collected. In other words, by using a generic element/attribute defined structure for every type element and attribute, all the data collected can be represented in a uniform way, and programs to do cross-correlations or mathematical combinations of data of different types or comparisons or side-by-side views or graphs between different data types can be more easily written without having to deal with the complexity of having to be able to handle data of many different types, field lengths but with the same semantics from different sources. These characteristics of the data structures allow data of different types selected by a user to be viewed and/or graphed or mathematically combined or manipulated in some user defined manner. This allows the relationships between the different data types over time to be observed for management analysis. In some embodiments, the user specifications as to how to combine or mathematically manipulate the data are checked to make sure they make sense. That is a user will not be allowed to divide a server name by a CPU speed since that makes no sense, but she would be allowed to divide a server utilization attribute expressed as an integer by a dollar cost for maintenance expressed as a floating point number.

The descriptions of the type and length of data fields defining the element/attribute relationships are stored, in the preferred embodiment, in three logical tables. One table stores the element descriptions, another table stores the descriptions of the type and length of each attribute data field, and a third table stores the mapping between each element and the attributes which define its identity in a "fingerprint". All complex systems have systems and subsystems within the system. These "containment" relationships are defined in another table data structure. Once all the attribute data is collected for all the elements using the "collection instructions" and data collector, the data for all element types is stored in one or more "collected data" tables in the common data store after being post processed to make any conversions necessary to convert the collected data to the data type and length format specified in the attribute definition. These "collected data" tables have columns for each attribute type, each column accepting only attribute data instances of the correct data types and field lengths defined in the element/attribute definition data structure and having the proper semantics. In other words, column 1 of the collected data table may be defined as storage for numbers such as 5 digit integers representing CPU speed in units of megahertz for a particular server element reported back by the operating system of that server element, and column two might be assigned to store only strings such as the server's vendor name. Each row of the table will store a single attribute instance data value.

An attribute data instance stored in the collected data table is a sample of the attributes value at a particular point in time. In the preferred embodiment, each entry in the data table for an attribute has a timestamp on it. The timestamp indicates either when the attribute data was collected or at least the sequence in which the attribute data was collected relative to when attribute data for other elements or attribute data for this element was previously created. There is typically a refresh schedule in the preferred species which causes the value of some or all of the attributes to be collected at intervals specified in the refresh schedule. Each element can have its own refresh interval so that rapidly changing elements can have their attribute data collected more frequently than other elements. Thus, changes over time of the value of every attribute can be observed at a configurable interval.

In addition to the refresh interval, data collection follows collection calendars. One or more collection calendars can be used to control at which time, day, and date data collection is to take place. Data collection may also take place as the result of user activity.

In the preferred embodiment, this data store can be searched simultaneously and displayed in a view or graph defined by the user to observe relationships between the different pieces of data over time. This is done using a "correlation index" which is a specification established by the user as to which attribute data to retrieve from the collected data table and how to display it or graph it. The data selected from the collected data tables is typically stored in locations in a correlation table data structure at locations specified in the "correlation index".

This use of a common data store allows easy integration of all data into reports and provides easy access for purposes of cross referencing certain types of data against other types of data.

A "collection instruction" is a program, script, or list of instructions to be followed by an agent computer called a "data collector" to gather attribute data of a specific attribute for a specific element (asset) or gather attribute data associated with a group of element attributes. For example, if the type of an unknown operating system on a particular computer on the network is to be determined, the "collection instruction" will, in one embodiment, tell the collection gateway to send a particular type or types of network packets that has an undefined type of response packet. This will cause whatever operating system is installed to respond in its own unique way. Fingerprints for all the known or detectable operating systems can then be used to examine the response packet and determine which type of operating system is installed. Another example of a "collection instruction" is as follows. Once the operating system has been determined, it is known what type of queries to make to that operating system over which protocols to determine various things such as: what type of computer it is running on; what file system is mounted; how to determine which processes (computer programs in execution) are running; what chip set the computer uses; which network cards are installed; and which files are present in the file system. A "collection instruction" to find out, for example, which processes are actually in execution at a particular time would instruct the agent to send a message through the network to the operating system to invoke a particular function call of an application programmatic interface which the operating system provides to report back information of the type needed. That message will make the function call and pass the operating system any information it needs in conjunction with that function call. The operating system will respond with information detailing which processes are currently running as listed on its task list etc.

A "fingerprint" is a definition of the partial or complete identity of an asset by a list of the attributes that the asset can have. The list of attributes the asset will have is a "definition" and each attribute either contains a link to a "collection instruction" that controls a data collector to obtain that attribute data for that element or directly includes the "collection instruction" itself. Hereafter, the "definition" will be assumed to contain for each attribute a pointer to the "collection instruction" to gather that attribute data. For example, if a particular application program or suite of programs is installed on a computer such as the Oracle Business Intelligence suite of e-business applications, certain files will be present in the directory structure. The fingerprint for this version of the Oracle Business Intelligence suite of e-business applications will, in its included definition, indicate the names of these files and perhaps other information about them. The fingerprint's definition will be used to access the appropriate collection instructions and gather all the attribute data. That attribute data will then be post processed by a data collector process to format the collected data into the element/attribute format for each attribute of each element defined in data structure #1. Then the properly formatted data is stored in the collected data store defined by data structure #4 which is part of the common data store. Further processing is performed on the collected data to determine if the attributes of an element are present. If they are sufficiently present, then the computer will be determined to have the Oracle Business Intelligence suite of e-business applications element installed. In reality, this suite of applications would probably be broken up into multiple elements, each having a definition defining which files and/or other system information need to be present for that element to be present.

Fingerprints are used to collect all types of information about a company and identify which assets the company has from the collected information. In one sense, a fingerprint is a filter to look at a collected data set and determine which assets the company has from that data. Almost anything that leaves a mark on an organization can be "fingerprinted". Thus, a fingerprint may have attribute definitions that link to collection instructions that are designed to determine how many hours each day each employee in each different group within the company is working. These collection instructions would typically send e-mails to supervisors in each group or to the employees themselves asking them to send back reply e-mails reporting their workload.

A fingerprint must exist for every operating system, application program, type of computer, lease, license or other type of financial data or any other element that the system will be able to automatically recognize as present in the business organization.

One system within the genus of the invention will first collect all the information regarding computers, operating systems that are installed on all the networks of an entity and all the files that exist in the file systems of the operating systems and all the financial information. This information is gathered automatically using protocols, utilities, or API's available on a server executing the instructions of "definitions" on how to collect each type of data to be collected. The collected attribute data is stored in a data structure, and the attribute data is then compared to "fingerprints" which identify each type of asset by its attributes. A determination is then made based upon these comparisons as to which types of assets exist in the organization.

Another system within the genus of the invention will iteratively go through each fingerprint and determine which attributes (such as particular file names) have to be present for the asset of each fingerprint to be deemed to be present and then collect just that attribute data and compare it to the fingerprints to determine which assets are present. Specifically, the system will decompose each fingerprint to determine which attributes are defined by the fingerprint as being present if the element type corresponding to the fingerprint is present. Once the list of attributes that needs to be collected for each element type is known, the system will use the appropriate definitions for these attributes and go out and collect the data per the instructions in the definitions. The attribute data so collected will be stored in the data store and compared to the fingerprints. If sufficient attributes of a particular element type fingerprint are found to be present, then the system determines that the element type defined by that fingerprint is present and lists the asset in a catalog database.

BRIEF DESCRIPTION OF THE DRAWINGS

FIG. 3 is an example of a containment table which defines the system and subsystem relationships within the system.

FIG. 4 is an example of a user defined correlation table which defines which attribute data combinations a user wants views, graphs or other visual widgets of on her display.

FIG. 5 is an example of a collected data table where the collector processes store the instances of collected data.

FIG. 7 is an element tree data structure.

FIG. 8 is an element table that give element names and Ids and pointers to collector programs.

FIG. 9 is a table of attribute names and Ids.

FIGS. 10A and 10B are a mapping table between element Ids, attribute Ids and collector ids FIG. 11 is a table mapping element Ids to child element Ids.

FIG. 12 is a fingerprints table that maps element Ids to fingerprint rules.

FIG. 13 is a collectors table that maps collector IDs to the corresponding collection instructions for each attribute mapped to the element and fingerprint currently being processed.

FIG. 14 is an example of a data table that stored collected attribute data.

FIGS. 19A through 19C are a flowchart of a process to discover the assets in a system or designated portion of a system starting with no knowledge of the existence of any networks, servers or the operating systems thereof.

DETAILED DESCRIPTION OF THE PREFERRED EMBODIMENT

Figure 1:
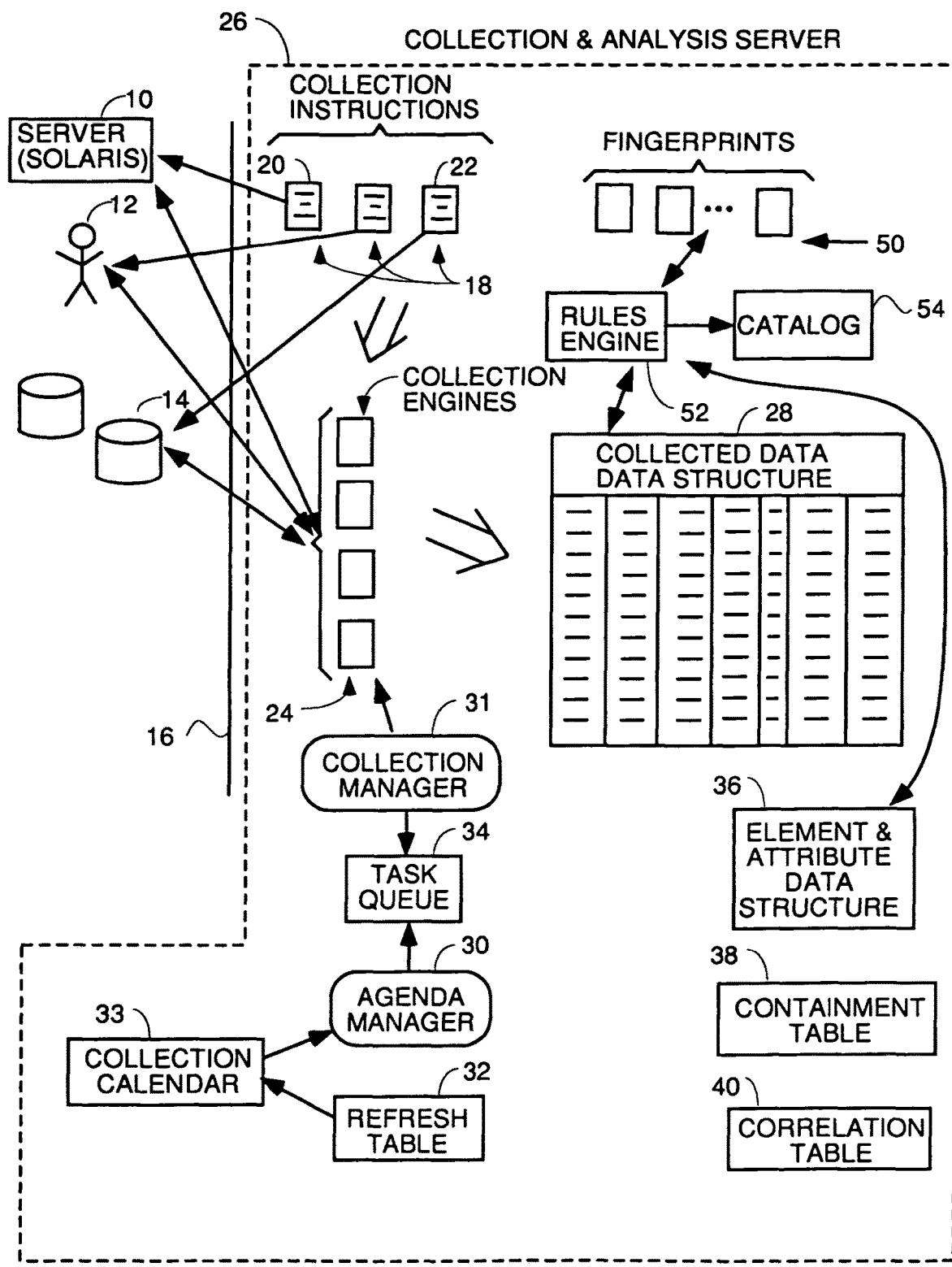
FIG. 1 is a block diagram illustrating the environment in which the invention works and some of the key elements of a system within the teachings of the invention.

Referring to FIG. 1, there is shown a block diagram illustrating the environment in which the invention works. FIG. 1 illustrates schematically the most important elements of a system within the teachings of the invention which can automatically retrieve attribute data and determine from it the makeup or DNA of the organization. In other words, a system like that shown in FIG. 1 can automatically determine the number and type of computing hardware assets, installed software, key elements of information about the organization and extracted key information from the organization's leases, contracts, licenses, maintenance agreements, financial statements, etc. Essentially, all the important information that defines the makeup or "genes" of a business organization or government can be automatically gathered and assets automatically identified from their attributes. This information can be periodically re-gathered to present an up-to-date picture of the makeup of an organization to management at substantially all times.

The sources of data from which information is to be collected in this particular organization are server 10, person 12 and file system 14. All these sources of data are connected together by a data path such a local area network 16 (which can be fully or partially wireless) and suitable interface circuitry or, in the case of a human, a workstation including a network interface card and an e-mail application. None of this hardware and software that does not form part of the invention is shown in detail in FIG. 1.

Everything to the right of line 16, representing the data path, represents processes, programs or data structures within a collection and analysis server 26 which implements the methods and apparatus of the invention. Typically this server is located at the customer premises, but, in some embodiments, it could be located remotely and make connections to the local area network of the customer via the internet or a dedicated WAN connection. Connections through the internet are more difficult to implement because businesses typically have firewalls and other security measures that must be dealt with before access to the internal LAN by a foreign computer will be granted.

A set of collection instructions, indicated generally at 18, are definitions and programs which serve to define what types of information can be gathered from each source and methods and protocols of doing so. For example, collection definition 20 may be for a server running a Solaris operating system and may define that one can get files, file systems mounted and processes currently in execution from such servers. Collection definition 22 for the file system 14 contains data indicating such things as the file system partitions, partition size, partition utilization, etc. can be gathered from the file system 14. The collection definitions then give specific step by step instructions to be followed by data collector processes, shown generally at 24. These collectors are processes in the collection server which can establish connections over existing protocols 16 to the various data sources under the guidance of the collection instructions 18. These processes actually collect the desired information needed by the system to identify which assets are present and extract information from people and documents that management desires to see. The collection instructions contain specific program instructions which control the collector processes 24 to traverse the network and communicate with the data source using the proper protocols and invoke predetermined function calls, read predetermined file or send predetermined e-mails addressed to specific people to extract the information needed.

The data collectors 24 can be any processes which are capable of running the program instructions of the collection instructions. The data collector processes must be capable of communicating with the data source devices, people or processes identified in the collection instructions using the necessary protocol(s). Those protocols include the various software layers and network communication hardware interface or gateway coupled to the collection and analysis server 26, the network protocols of whatever data path 16 the communication must traverse and the protocols to communicate with the appropriate process at the data source such as the operating system for server 10, the e-mail program of person 12 or the appropriate process in file system 14. Any collection process that can do this will suffice. In the preferred embodiment, the data collectors 24 are generic prior art "scrapers" which have been customized to teach them to speak the necessary protocols such as TCP/IP, SNMP, SSH, etc. which may be necessary to talk to the various data sources in the system.

Each data collection process 24 is identical in the preferred embodiment, and they are assigned to data collection tasks on availability basis. In the preferred embodiment, all the common processing is put into the data collectors such as libraries or adaptors for the different protocols the collector might have to use such as TCP/IP, IP only, UDP, Secure Sockets, SNMP, etc. This way, the collection instructions need not include all these protocols and can concentrate on doing the steps which are unique to gathering the specific data the collection instruction is designed to collect. In alternative embodiments, only the protocol libraries necessary to gather the particular data a collection instruction is designed to gather can be included in the collection instructions themselves. In other embodiments, the protocol libraries or adaptors can be shared by all the data collector processes and just accessed as needed.

Typically, data collection requests are queued and as a data collector process, running locally or across the network, becomes available, it retrieves the next data collection request and the appropriate collection instruction for that request if it has support for the requested collection protocol. Then it executes the collection instructions therein to retrieve the requested data and store it in the appropriate location in a collected data storage structure 28. In alternative embodiments, a single collection process can be used that has a queue of collection requests and processes them one by one by retrieving the appropriate collection instruction for each request and executing the instructions therein.

Collected data structures 28, an example of which is shown in FIG. 5, serve as the initial repository for the collected data obtained by the collectors. This is typically a table which has a column for storage of instances of each different attribute, with the rows in the column storing the value of that attribute at each of a plurality of different times. The intervals between the instances of the same attribute data vary from attribute to attribute, and are established by a refresh schedule in refresh table 32 in FIG. 1. Typically, all attributes are collected repeatedly on a "refresh schedule", subject to a collection calendar that drives at what time, day, and date collection shall take place. This allows analysis of how the value of an attribute changes over time.

An agenda manager process 30 consults the refresh schedule for each attribute in a refresh table 32 and also consults a collection calendar 33 to determine times and dates of collection of attributes. If this schedule data indicates it is time to collect an attribute, the agenda manager 30 puts a collection request in a task queue 34 for collection. A collection manager 31 periodically or continually scans the task queue 34 for tasks to be accomplished, and if a task is found, the collection manager 31 gets the task from the task queue 34 and retrieves the appropriate collection instruction for the requested attribute and executes its instructions using an available one of the collection engines 24. The collector then retrieves the data and stores it in the next available row of the column in collected data tables 28 that store instances of that attribute.

Figure 2:
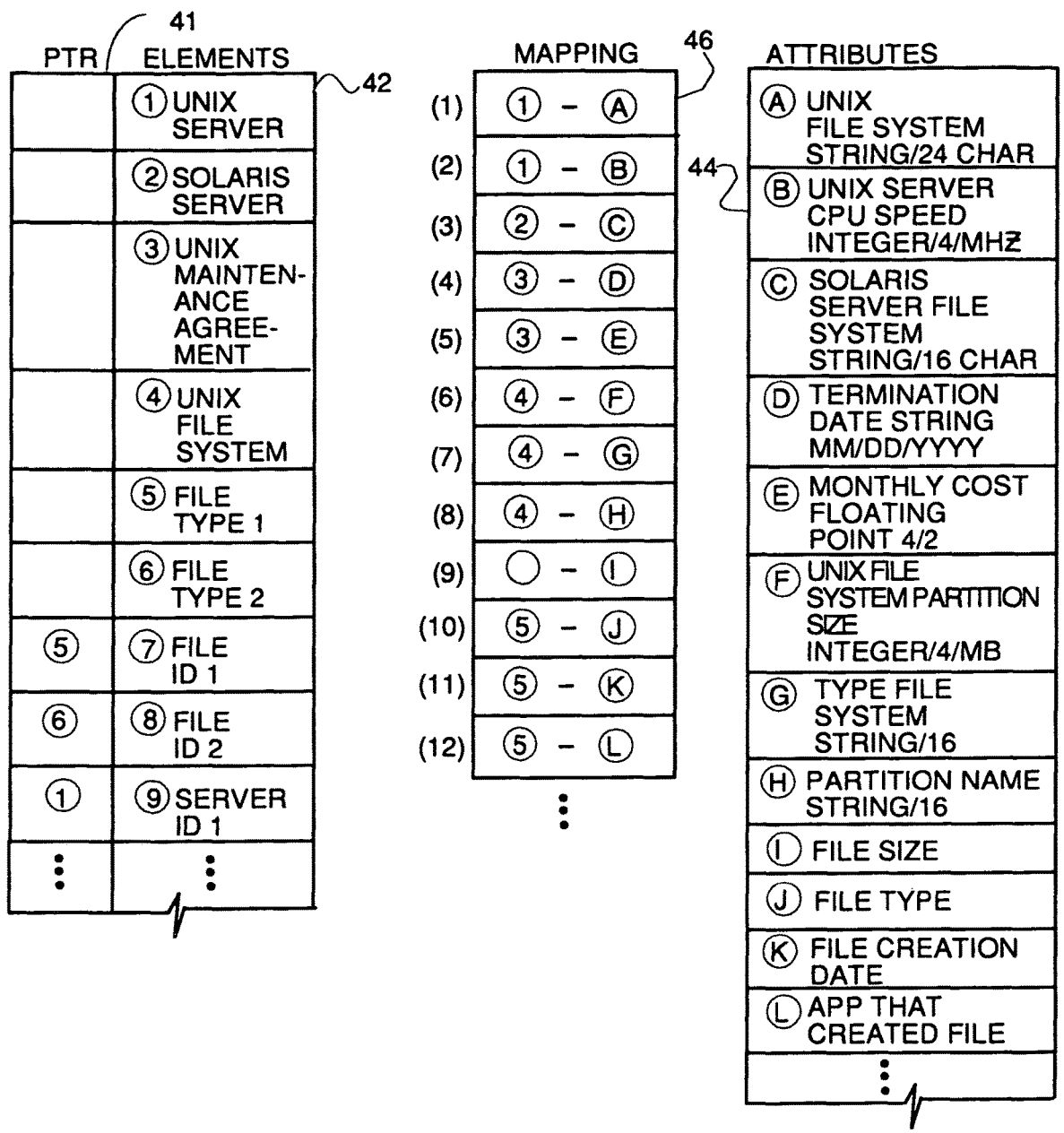
FIG. 2 is an example of the element/attribute data structure which defines the elements and defines the attributes of each element with semantic data and format data.

Each column in the collected data table is designed to receive only attribute data of the type and length and semantics defined for the attribute in an element/attribute data structure 30. In other words, each attribute has its instances stored in only one column of the collected data table, and the instance data must be in the format defined in the element/attribute data structure of FIG. 2. If the collected attribute data is not in the proper format, it is post processed to be in the proper format before it is stored in the collected data table. This makes it easier to write programs that deal with the collected data because the programmer knows that all instances of a particular attribute will have the same format. In FIG. 5, the semantics of the attribute stored in each column and format data which defines the type of data, length and units of measure defined in the element/attribute table of FIG. 2 are listed above the double line 48, and the actual attribute data instances for each attribute are stored in each column below the double line.

An element/attribute data structure 36 stores element entries for all the elements the system can identify and defines the attributes each element in the system has. The data structure 36 also serves as a catalog of all the instances found of a particular element type. An example of an attribute/element data structure 36 is shown in FIG. 2. In the preferred embodiment, this data structure is comprised of three tables. The first table, shown at 42 in FIG. 2, has an entry for each element definition and an entry for each instance of an element that has been found by the system with a pointer to the element definition. For example, elements 7 and 8 are file instances that have been found with pointers to element entries 5 and 6, respectively. This means that the file which the system found and gave an element identification File ID 1 is an instance of file type 1 defined by the attributes mapped to entry 5 in the element column. Likewise, the file instance found by the system and entered as an element at entry 8 is an instance of file type 2 defined by the attributes mapped to and which define the file element at entry 6. Likewise, the system found a server and assigned it ID 1 and made an entry at 9 in the element table. This entry has a pointer to entry 1 indicating the server instance at 9 is a UNIX server defined by the attributes mapped to entry 1. Only instances of elements have pointers in pointer column, and these instances define the elements that have been found in the system. The elements with pointer entries are a catalogue of everything that makes up the company.

Typically, the element definition will be semantic data naming the element or telling what the element is. Each element has one or more attributes which are defined in a second table shown at 44. Semantic data and form data in each entry of this second table names the attribute defined by that entry or defines what it is and what form the attribute data is to take, e.g., floating point, integer, etc. For example, entry A in this table is an attribute named Unix file system. This name is a string of alphanumeric symbols 24 characters long or fewer. Entry B is an attribute named UNIX server CPU speed which will be an integer of 4 digits or fewer with units of mHz. Entry E is an attribute named monthly cost which will be a floating point number with 4 digits to the left of the decimal and 2 digits to the right. These definitions are used to post process gathered data to the format of the definition for storage in the collected data table 28. The third table, shown at 46, is a mapping table that defines which attributes in the second table belong to which elements in the first table. For example, attribute A in table 44 is an attribute of element 1 in table 42, and attribute D is an attribute of element 3. There are subsystem relationships that are inherent in the data structure of FIG. 2, but not specifically identified. For example, element 4 "UNIX file system" is actually an attribute of UNIX server element 1 in table 42, and is defined at entry A in table 44.

Every system may have systems and subsystems. A containment table 38, an example of which is shown in FIG. 3, defines which elements are sub-elements or subsystems of other elements. Row 1 shows that the UNIX server, element 1 in table 42, FIG. 2, has as a first subsystem or child element, the UNIX file system listed as attribute A in table 44 of FIG. 2 and element 4 in table 42. The UNIX file system itself is listed as an element in table 42 because it has attributes mapped to it by rows 6-9 of the mapping table 46 of FIG. 2. Specifically, the UNIX file system has as attributes the partition size, type of file system, and the partition name-attributes defined at entries F, G and H in table 44. Row 2 of the containment table shows that UNIX file server element also has another subsystem which is the UNIX maintenance agreement defined at element entry 3 in table 42. The UNIX maintenance agreement has defined attributes D and E of table 44, i.e., the termination date and monthly cost. Row 3 encodes the parent-child relationship between the UNIX file system and a file type 1 element. Row 4 of the containment table encodes the grandparent-grandchild relationship between the UNIX file server and the file type 1 element.

A correlation table 40 in FIG. 1 stores the attribute data that allows a user to see the relationships between different user selected attributes over time. An example of this table is shown in FIG. 4. The correlation table supports user defined visual interface "widgets" of different types such as graphs or juxtaposition views between different attributes as well as other functions. This allows the user to compare different attributes over time such as server utilization versus maintenance costs. The particular example illustrated by FIG. 4 supports a juxtaposed view widget comparing server bandwidth versus available disk space over time as compared to maximum available disk space on the server. The correlation table is an optional element and is not part of the broadest definition of the genus of the invention since the immediate value of the system is believed to be its ability to automatically gather attribute data, compare it to fingerprints, identify assets and automatically extract other important information management needs from documents, files and by sending messages to people who know the needed information. The correlation table and visual widgets are nice features in various species that have greater utility within the inventive genus. Likewise, the refresh table and agenda manager functions in FIG. 1 are attributes of useful species within the genus but are not part of the broadest definition of the genus. This is because it is useful to be able to extract the attribute data and catalog it one time, and the ability to do it again periodically and automatically is nice to have but not essential to the most basic utility of the invention.

Returning to the consideration of FIG. 1, once all the attribute data has been stored in the collected data table 28, a comparison process compares the attribute data to a plurality of "fingerprints" shown generally as the data structures 50. These fingerprints combine with the element/attribute definitions stored in data structure 36 illustrated in FIG. 2, to completely define the elements, i.e., systems and subsystems, the system of FIG. 1 is able to automatically detect. The element/attribute definitions in data structure 36 define what each element is and which attributes that element has. The fingerprints shown at 50 are data structures which define rules regarding which attributes may be found for that element to be deemed to exist and logical rules to follow in case not all the attributes of an element definition are found. For example, some installs of software fail, and not all the files of a complete installation are installed. Other installations of suites of software allow custom installations where a user can install only some components or tools and not others. The fingerprints 50 contain all the rules and logic to look at the found attributes and determine if a failed installation has occurred or only a partial installation of some programs and/or tools has been selected and properly identify that asset to management. For example, if all the attributes of an Oracle database are found except for the actual executable program oracle.exe, the Oracle database fingerprint will contain one or more rules regarding how to categorize this situation. Usually the rule is that if you do not find a particular main executable file for a program, you do not have that program installed even if all its DLLs and other support files and satellite programs are found.

A rules engine process 52 uses the rules in the fingerprints and the definitions in the element/attribute data structure 36 as a filter to look at the collected attribute data in collected data table 28. If all the attributes of a particular element are found in the collected data, an entry in the element catalog data store is made indicating that the element is present. If only some of the attributes are present, the rules compare applies the rules in the fingerprint for that element to whatever attributes are found to determine if the element is a partial installation of only some tools or programs selected by the user or an installation failure and makes an appropriate entry in the element catalog 54.

Referring to, there is shown a more detailed block diagram of the preferred embodiment of the program and data structure architecture for a server within the genus of the invention. Although the actual computer is not shown, all the functionality within the square blocks and ovals represents programs running on the server, and the data structures within the canisters represent data stored on the server's disk array. The collected data of table 28 is stored on one or more hard disks storing a file system. In this file system, there are physical blocks of storage dedicated to each of the data structures represented by the canisters on the lowest two rows of FIG. 6. The data structures can also be distributed or stored remotely. Each canister name refers to the logical name of the data structure. Each data structure hereafter will just be referred to by its name without reference to where or how the data is stored. The correlation data 40 is the data selected from the collected data by the user by specification of a "correlation index" which supports the user defined visual widgets. The log data 60 is data the server logs to keep track of its activities. The user/group data 62 defines which users are in which groups and what privileges each user has to exercise various functionality of the system.

Figure 6:
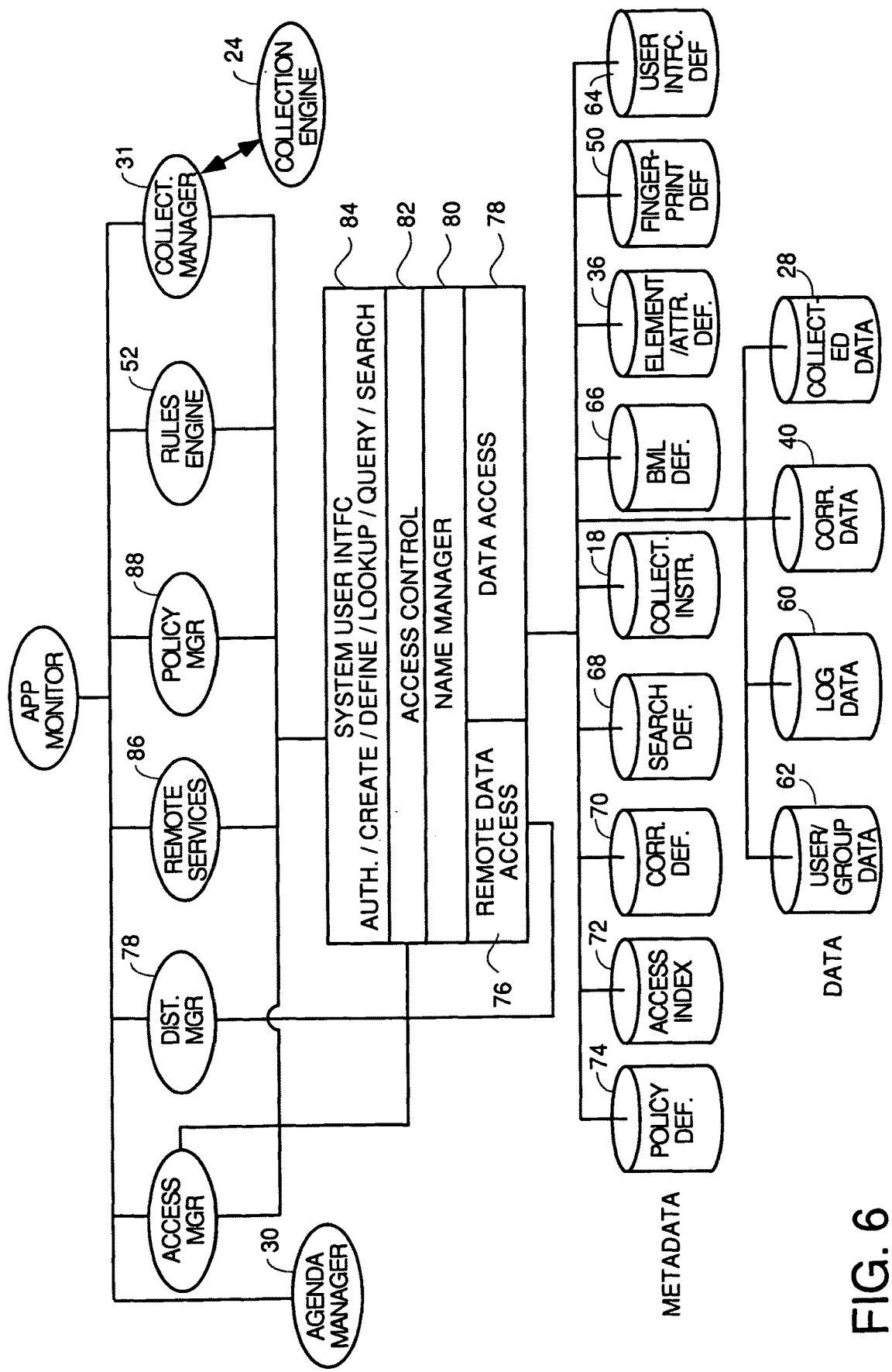
FIG. 6 is a more detailed block diagram of the preferred embodiment of the program and data structure architecture for a server within the genus of the invention.

The collection and analysis server of FIG. 6 also stores a plurality of metadata structures which give meaning to the raw data stored in data structures 28, 40, 60 and 62. A user interface data structure 64 stores data defining the pages that can be viewed via the user interface and defining the types of "widgets" that can be displayed on the user interface.

A fingerprint definitions data structure 50 contains the rules or logic used on the attribute data in collected data structure 28 to determine if all the attributes of the various elements have been found and to add the element to a catalog of elements. The data regarding which attributes each element has is stored in the elements/attributes data structure 36. The fingerprint definitions 50 also contain rules to handle situations where not all the attributes of an element are found or where an element comprises a suite of programs where the user can define which programs of the suite to install.

A BML data structure 66 stores data which defines whether a particular process is or is not running or which defines how to use the collected data in a logical, user defined sequence to determine whatever the user wants to determine. The result of a BML is another element which can be displayed as a widget.

The collection instructions data structure 18 stores sets of instructions for each attribute of each element which explains how to collect data for that element.

A search definition data structure 68 stores data that defines searches a user wants to do such as, "show me all the servers running Solaris."

A correlation definition data structure 70 stores the user defined correlation indexes which define which views the user wants to see and which elements and attributes are to be displayed using which widgets defined in data structure 64.

An access index data structure 72 stores data restricting data and views various users can see.

A policy definitions data structure 74 stores data defining policies that restrict which users can exercise certain functionalities of the system such as those that consume large amounts of server bandwidth and when they can do those things.

A remote data access function 76 cooperates with a distribution manager function 78 to integrate two or more servers like those shown in FIG. 6 so that they operate like one server to the user. In other words, if one of the servers gathers and stores certain attribute data and the other server gathers and stores certain other attribute data, then when a user exercises some function on one server that needs data from the other server, functions 76 and 78 cooperate to go across the network to the other server and get the needed data so that the function can be performed.

Data access function 78 provides the functionality to retrieve any needed metadata or attribute data or other data stored in data structures 28, 40, 60 and 62.

A name manager function 80 creates and manages mappings between names given to data by users and the actual data to which the name pertains.

An access control function 82 uses the users and groups privilege data and the policy definition data to block unauthorized users from using the system and block authorized users from exercising functionality they have no privileges to use and implement any bandwidth protection policies.

A system interface function 84 provides the basic functionality by which client applications operate the system. This program provides the necessary functionality to: authenticate users at log-on; allow users to create new elements and define BML definitions and define new widgets; lookup definitions of attributes and collection instructions and alter them; query the system to find and show the values of specified attribute data; and provide a search template that allows the user to define what she is looking for by search keys and then decomposes the data in the search template into one or more queries.

A remote services function 86 allows an authorized client applications to exercise the functionality of the collection and analysis server from remote locations anywhere on the network.

A policy manager function 88 provides the functionality to control the server to implement the policies defined by the policy definitions data structure.

A rules engine 52 provides the functionality to control the server to automatically determine which elements are present in the business organization. Specifically, the rules engine uses the rules defined in the fingerprints and the element/attribute data structure definitions to analyze the collected attribute data in data structure 28 to determine which elements are present in the system and what partial installations or failed installations exist in the system and catalog them.

An agenda manager 30 provides the functionality to determine when attribute data collection requests to collect data from data sources need to be made. This is done by consulting a refresh table which (not shown but represented by block 32 in FIG. 1) determines the intervals at which each attribute is collected, and by consulting a collection calender (not shown but represented by block 33 in FIG. 1) which contains data defining the dates on which various attributes are collected. When such a collection action is needed, the agenda manager places collection tasks in the task queue 34 in FIG. 1. In the preferred embodiment, collection tasks get placed in the task queue automatically in accordance with a schedule in refresh table 32 and the collection calendar. Refresh may also take place as the result of a user action. The collection manager 31 continuously or periodically scans the task queue 34 in FIG. 1, and when it finds that a task is present, locates an available collection engine 24 and the correct collection instructure (20-22 in FIG. 1) for the attribute to be collected and causes the collection engine to execute the collection instruction to gather the attribute data and put it into the collected data store 28.

FIGS. 7 through 14 are examples of the core data structures which enable the system to run. Although not all data types and fingerprints and collectors are defined in FIGS. 7-14 for a typical system, FIGS. 7-14 are good examples of the core concepts. FIGS. 7-14 include: the definitions of very important elements or data types in every system; fingerprints for these important data types; examples of data collection instructions for various attributes; examples of actual data collected for these elements; examples of fingerprint rules used to evaluate collected data to determine is an element is present or not present; the relationships between these data elements and their attributes; and examples of parent—child element containment relationships for these type elements. These data structures are believed to be unique standing alone.

Figure 15:
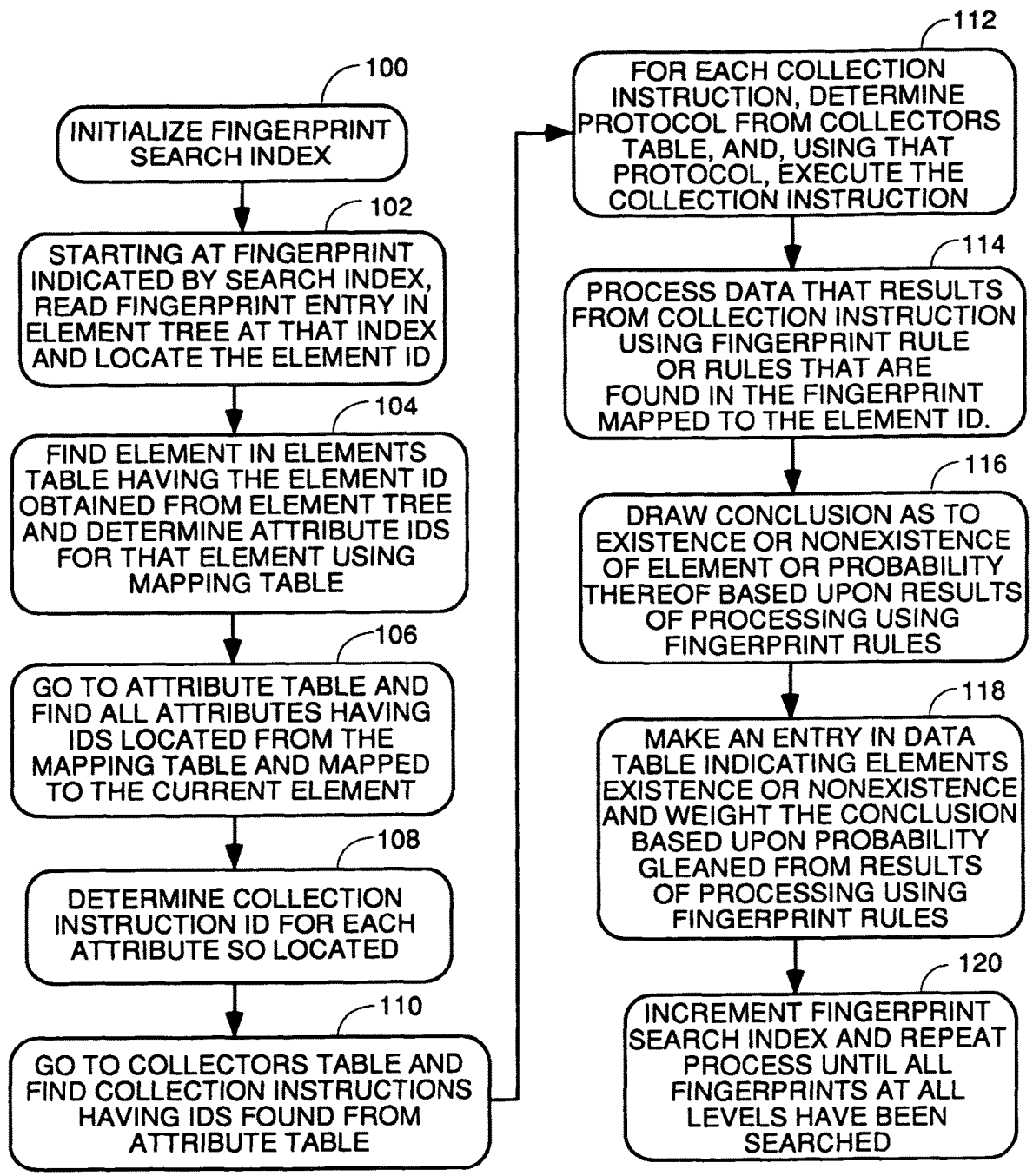
FIG. 15 is a flowchart of a process to use fingerprints to automatically collect data and categorize assets.

FIG. 15 is an example of a discovery process within the genus of processes to use the fingerprints and collection instructions defined in the data structures of FIGS. 7-14 to automatically gather data from entities in a business organization. The process of FIG. 15 also determines which of the elements defined in the data structures the organization has or does not have and/or the probabilities that the organization does or does not have each element. The data structures of FIGS. 7-14 define what the system expects to see or, more precisely, is capable of seeing using the process of FIG. 15 working with the data structures. The data structures of FIGS. 7-14 will be discussed jointly in conjunction with the discussion of the process of FIG. 15 to illustrate how the process invention uses the data structure invention.

Referring to FIG. 15, step 100 initializes a fingerprint search index which is used to keep track of which fingerprint is currently being processed. Referring to the element tree data structure of FIG. 7. There is a top section called Types, starting at line 101, which defines all the different types of elements the system can recognize. The defined types are shared in that every instance of collected data for a particular type element will have the same attributes as defined in the type section. The numbers in parenthesis next to each element type is the element ID.

There is a fingerprint section starting at line 103 which defines the various fingerprints that exist in the system and defines the types of elements the system can recognize from collected attribute data. There is also a section 105 which defines the data format for each item of data representing an instance of an attribute and which also stores the instances of the attributes.

Each line below the types line 101 and above the fingerprint line 103, represents a different type element the system can gather data about and automatically recognize from the data. The element tree defines the structure of the data in the system. The indentation relationships in the element tree type section reflects the parent-child inheritance relationships between element types. For example, the file type element, ID=$_5$, on line 121 has name and size attributes. The UNIX type on line 123 is a type of file element that inherits the attributes name and size of its parent type File element on line 121. The UNIX file type therefore has inherited attributes name and size and also has its own attribute "owner", and has an element ID of 10.5 indicating it has inherited attributes from element ID 5. The syntax and semantics of each entry in the element tree is shown at line 125 just below the title.

The indentations in the fingerprint section define the logical relationships in the discovery process of FIG. 15 which is followed to collect the data when starting from a completely unknown network configuration and identify which elements are and are not present. For example, the first fingerprint that will be used is at line 107 and determines if a network is present. The network element fingerprint shows four attributes: the network ID, a mask value, a bottom IP address and a top IP address. This type of discovery process is different than the prior art because it starts from a completely unknown configuration and automatically discovers everything it needs using fingerprints to define attributes and collection processes to collect the values of those attributes and fingerprint rules to examine the collected data to determine if the element is there, partially there or not there. In the prior art of monitoring systems, it was necessary to choose a monitoring system, identify a particular server to the monitoring system, tell the monitoring system what type of operating system the server was running and then install an agent on the server and/or every desktop in the LAN. The agent then goes out and discovers what type of network cards are installed, what processes are running etc. and reports back to the monitoring system. Thus, each time the monitoring system or agent software is modified, the agents had to be reinstalled on every server and desktop which is time consuming and expensive. The process of FIG. 15 and the data structures of FIGS. 7-14 are the enabling technologies that allow an entire business organizations assets to be found and catalogued without the huge overhead of installed agents and the labor of predefining to the monitoring system all the servers, desktops and operating systems on the LAN or LANs of the organization.

If a network is found, then the next step would be to determine all the network interface cards that are coupled to the network using the NIC fingerprint at line 109. The NICs are all coupled to computers, so the next question is what types of operating systems are running on those computers. The Solaris 2.7 fingerprint on line 111 is one type of fingerprint that can be used to determine if any of the computers are running this operating system. Other fingerprints not shown would usually be present for Windows NT, Windows 98, etc.

Typically, under each operating system fingerprint, there would be hundreds of other fingerprints defining many types of elements such as application program packages the attributes of which can be collected by invoking the proper function calls of the operating system.

Once the type of operating system on a particular computer has been determined, the next thing the system would like to know is whether it is a web server. The HTTP fingerprint on line 113 is used to determine if the server is running a web server process.

The next question of interest to the system is who is the superuser of the computer just located. That is the purpose of the fingerprint at line 115. Typically, the collection instruction in this type fingerprint will cause the system to send out an e-mail to an administrative person who knows the name of the superuser with a request to send back an e-mail, although other means for collecting this data attribute may be encoded in the fingerprint. Next, the amount of memory needs to be known, and that is the purpose of the fingerprint at line 117. The CPU type is of interest next, and that is the purpose of the fingerprint at line 119.

The indentations in the data section starting at line 105 just track the indentations of the fingerprint section as the order of the fingerprints is the order in which data is collected. Multiple relationships are possible between data elements.

Line 127 is the data of an instance of a network found in the hypothetical example. This network has a network ID of 1.1.1.0, a mask value of 255.255.255.0, a bottom IP address of 1.1.1.2 and a top IP address of 1.1.1.254. Line 129 represents the data of an instance of a particular NIC that has been found with an IP address of 1.1.1.20 and a response attribute of 25 milliseconds.

Step 100 in FIG. 15 starts the automated data collection process by setting the search index pointer at line 107 in FIG. 7. Step 102 is the process of reading the fingerprint entry in the element tree at the location of the pointer (line 107 on this first pass through the loop) and determining the element ID to which this fingerprint pertains. In this case, the element ID is 101. Reference to the elements table of FIG. 8 shows that there is no type ID or collector ID for this element per se. In step 104, this element ID is used as a search key to search a mapping table to determine which attributes that element has. The mapping table is shown in FIG. 10A. The element ID 101 for the network element is mapped to attribute IDs 68, 69, 70 and 71.

Step 106 represents the process of using each of the attribute IDs located in step 104 as search keys in the attribute table of FIG. 9. In the example, all the attribute IDs 68, 69, 70 and 71 which are mapped to element ID 101 are located in the table of FIG. 9.

Step 108 represents performing the step of determining the collection instruction ID for each attribute mapped to the fingerprint and element currently being processed. One or more attributes can be collected through a single collection instruction. In alternative embodiments, the attributes will be obtained one at a time during each pass through the loop and the collection instruction ID for only one attribute will be found and executed on each pass through the loop and there will be a test at the end of the loop to determine if all collection instructions for all attributes mapped to the current fingerprint have been executed. This can be an inner loop within an outer loop with the outer loop processing one fingerprint per pass through the loop and the inner loop iterating as many times as there are attributes. When all the attributes have had their collection instructions processed in this alternative embodiment, the fingerprint rules are applied to the collected data and an appropriate entry is made in the data table regarding the existence, degree or probability of existence, or nonexistence of the element. Then the fingerprint search index pointer is moved to the next fingerprint to be processed and the processing starts again for the next fingerprint. In the embodiment of FIG. 15, all the attributes are determined in step 106 and all their collection instruction IDs are determined in step 108. The collection instruction IDs are determined by using the element ID as a search key in the elements table of FIGS. 10A and 10B and looking up the collector id in column 3 mapped to each attribute mapped to the element ID. In the example, these collector IDs are 208, 209, 210 and 211.

In step 110, the system goes to the collectors table of FIG. 13 and uses the collector IDs determined in step 108 to search for and find the collection instruction for each attribute mapped to the element and fingerprint currently being processed. Those collection instructions are circled in FIG. 13, and the collection instruction itself is in the Statement column. The protocol to use is identified in the Method column.

Step 112 is the process of determining the protocol to use for each collection instruction for each attribute mapped to the fingerprint for the element currently being processed. This is done simply by reading the entry in the Method column for each of the collector IDs mapped to the element ID currently being processed. More than one method or protocol may be used in a single fingerprint to perform system identification by multiple means. Step 112 also represents the process of accessing the protocol library identified in the Method column and using the appropriate protocol from that library to execute the command or operation specified in the Statement column.

Step 114 is the process of applying the fingerprint logical rule or rules to the attribute data collected in step 112 for the element currently being processed to draw a conclusion regarding the probability of existence or nonexistence of the element whose fingerprint is currently being processed. This is done by using the element ID as a search key to search the fingerprints table of FIG. 12. In the example, element ID maps to two different rules defined in the Rule column. The seq column defines the sequence in which these rules are to be applied to the collected data. In the example, the first rule invokes a function call of an application programmatic interface to run a program to examine the collected network ID attribute data and determine if that is a valid network ID. If the network ID is valid, a true result is returned. The Trueweight and Falseweight columns give weighting factors to use if the result of application of the rule is true or false, respectively. Step 116 represents the process of drawing conclusions regarding the existence or nonexistence, or probability thereof, of the element to which the fingerprint currently being processed pertains.

In step 118, an entry for the element mapped to the fingerprint currently being processed is made in the data table of FIG. 14. Referring to FIG. 7, line 127, the attribute data for an instance of a network having element ID 101 is shown. This data instance has its own ID which is 1001. In FIG. 14, the values for each of the attributes of the fingerprint mapped to network element ID 101 are shown on data instance ID 1001 in the first column (this column is labeled Elementid, but, more precisely, should be labeled data instance ID). The second column indicates this attribute data was collected at a time corresponding to timestamp 40. The actual values for the four attributes of the network element specified in the fingerprint are shown in columns 3 through 6 with the column Attr1 containing the network ID, column Attr2 containing the mask value for this network.

Step 120 increments the fingerprint search pointer index to point at the next fingerprint to be processed. In the example, the next fingerprint to be processed would be on line 109 of FIG. 7. In alternative embodiments, before each fingerprint is used to collect attribute data and analyze it, configuration data is checked to make sure the fingerprint is "turned on", i.e., the system administrator wants new attribute data gathered about the element that corresponds to the fingerprint. In the claims, fingerprints that are "turned on" are referred to as "active". This functionality allows the system administrator to block gathering of attribute data about some or all elements. This can be done at every level of the hierarchical organization of fingerprints shown in FIG. 7 so that entire levels are blocked off or just some elements on certain levels are blocked off. In still other alternative embodiments, configuration data is used to turn fingerprints on or off and refresh schedule data is used to determine how often to collect the attribute data for each element. Each element can have its own refresh schedule. In this alternative embodiment, step 120 in FIG. 15 represents the process of picking another fingerprint which configuration data indicates is turned on and which the refresh schedule data indicates is ripe for another discovery effort. Thus, the process of FIG. 15 would be repeated until every "active" fingerprint which was ripe for processing had been processed.

The process described above to automatically gather attribute data and analyze it using fingerprint rules to determine the existence of the element is then repeated. In the example, the next fingerprint is for a network interface card. In gathering the attribute data for this type of element, the system would cycle through all the valid IP addresses of the network just found and send out a packet to each address to determine if a response was received. Each NIC which responds represents a device coupled to the network. Then, for each NIC that responds, the system wants to know the type of operating system the device is running and information about whether the device is a web server, has a superuser and who that is, its memory size and CPU type, etc. To gather that information, each of the fingerprints on lines 111, 113, 115, 117, 119 and 131 of FIG. 7 is processed as described in FIG. 15 for each NIC that responds. That is the meaning of the indentation of lines 111, 113, 115, 117, 119 and 131 under the NIC fingerprint on line 109.

Figure 16A:
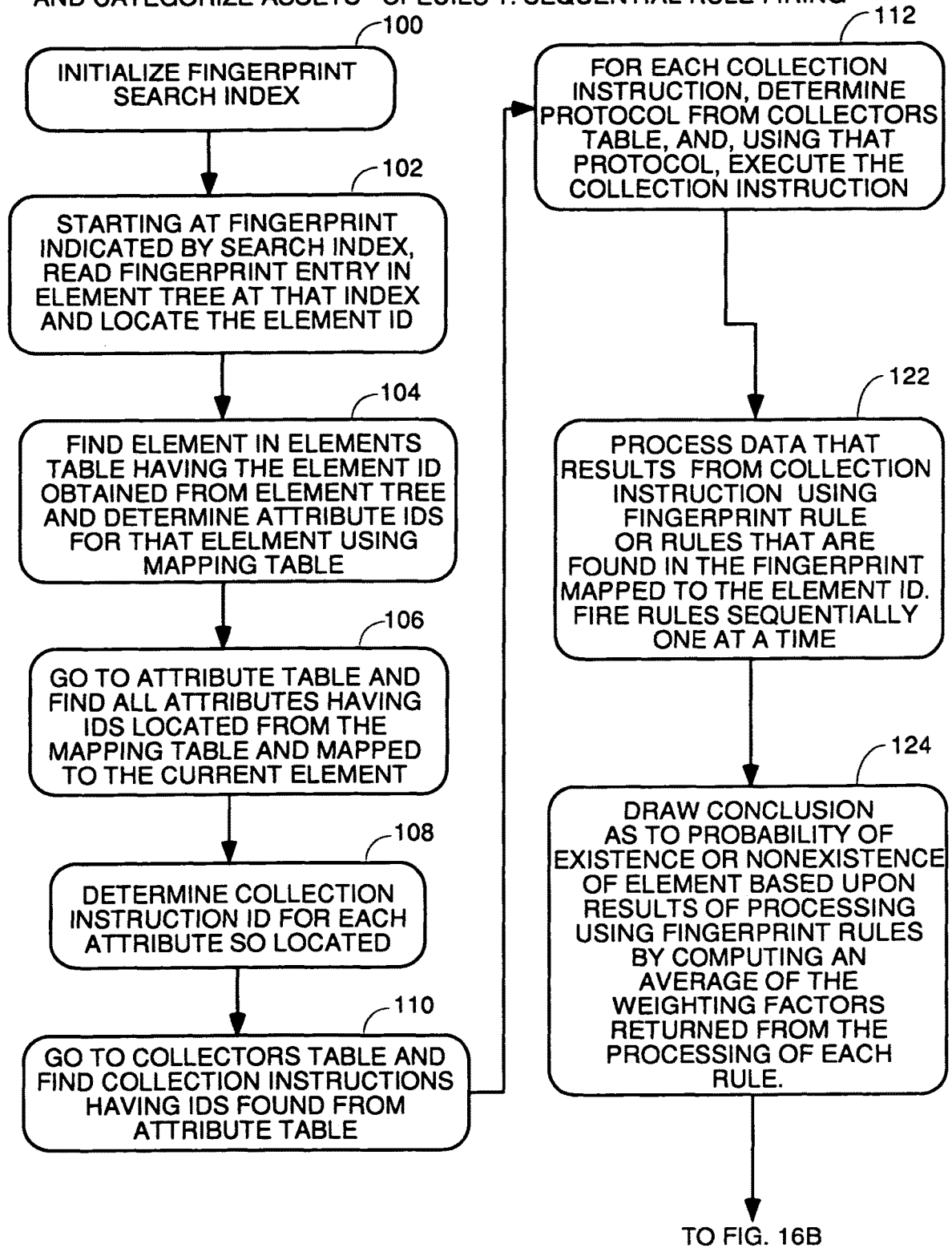
FIGS. 16A through 16B are a flowchart of a process to use fingerprints to automatically collect data using a sequential rule firing algorithm.
Figure 16B:
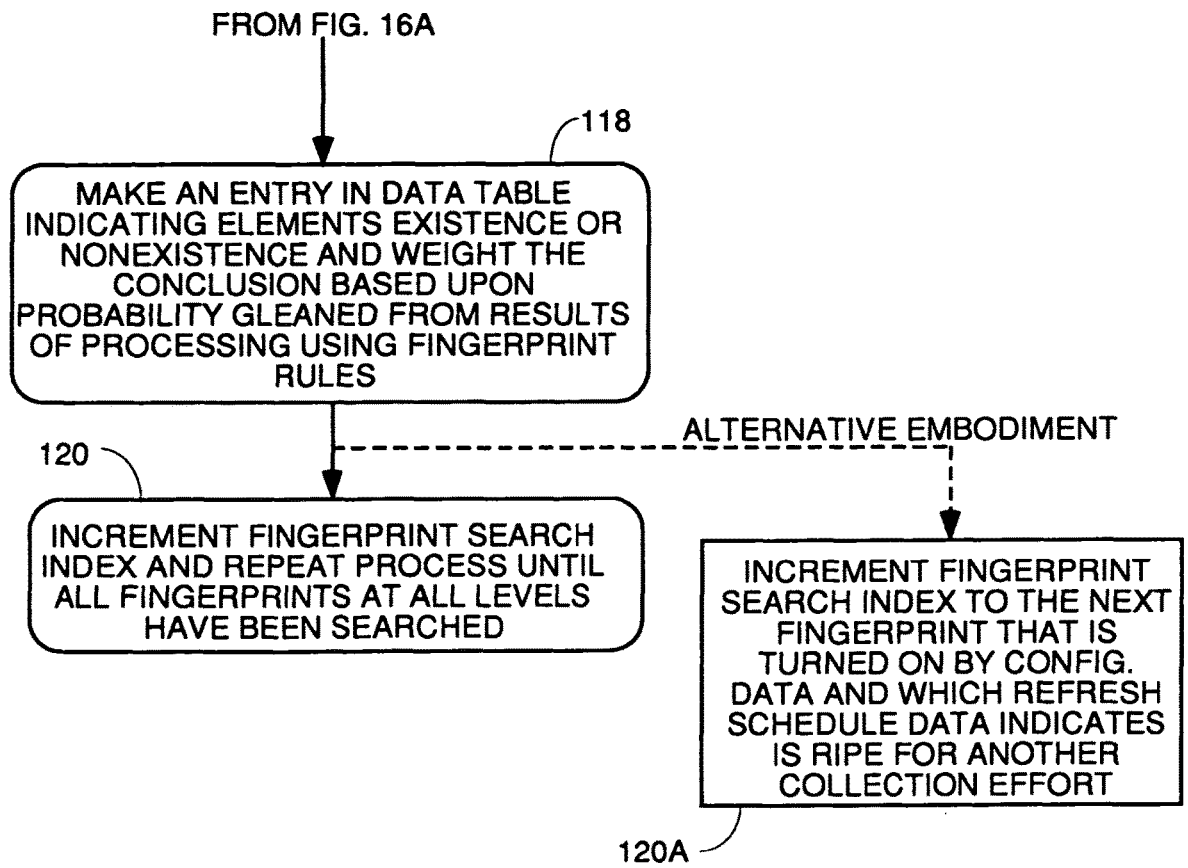

There are three different species or alternative embodiments regarding how fingerprint rules which are represented by the generic steps 114 and 116. The first is represented by the flowchart of FIGS. 16A and 16B. In this first alternative species, the one or more rules of the fingerprint are simply applied to the collected data sequentially, one at a time in step 122. A conclusion is then drawn as to the probability of the existence or nonexistence of the element by computing a running average of the weighting factors returned by application of each rule in step 124. The final weight computed from the averaging process is entered in the data table in a column not shown in step 118. All steps in FIGS. 16A and 16B having the same reference number as steps in FIG. 15 represent the same processing as they did in FIG. 15. The alternative species using configuration data to turn fingerprints on and off and refresh schedule data to control the interval between collection attempts of any fingerprints that are turned on is indicated by step 120A.

A weight of 100 means the element is definitely present. A final weight of 0 means the element is definitely not present. Any weight between these two extremes means there is some uncertainty as to the existence of the element or there was, for example, a partial installation in the case of a software application.

Figure 17A:
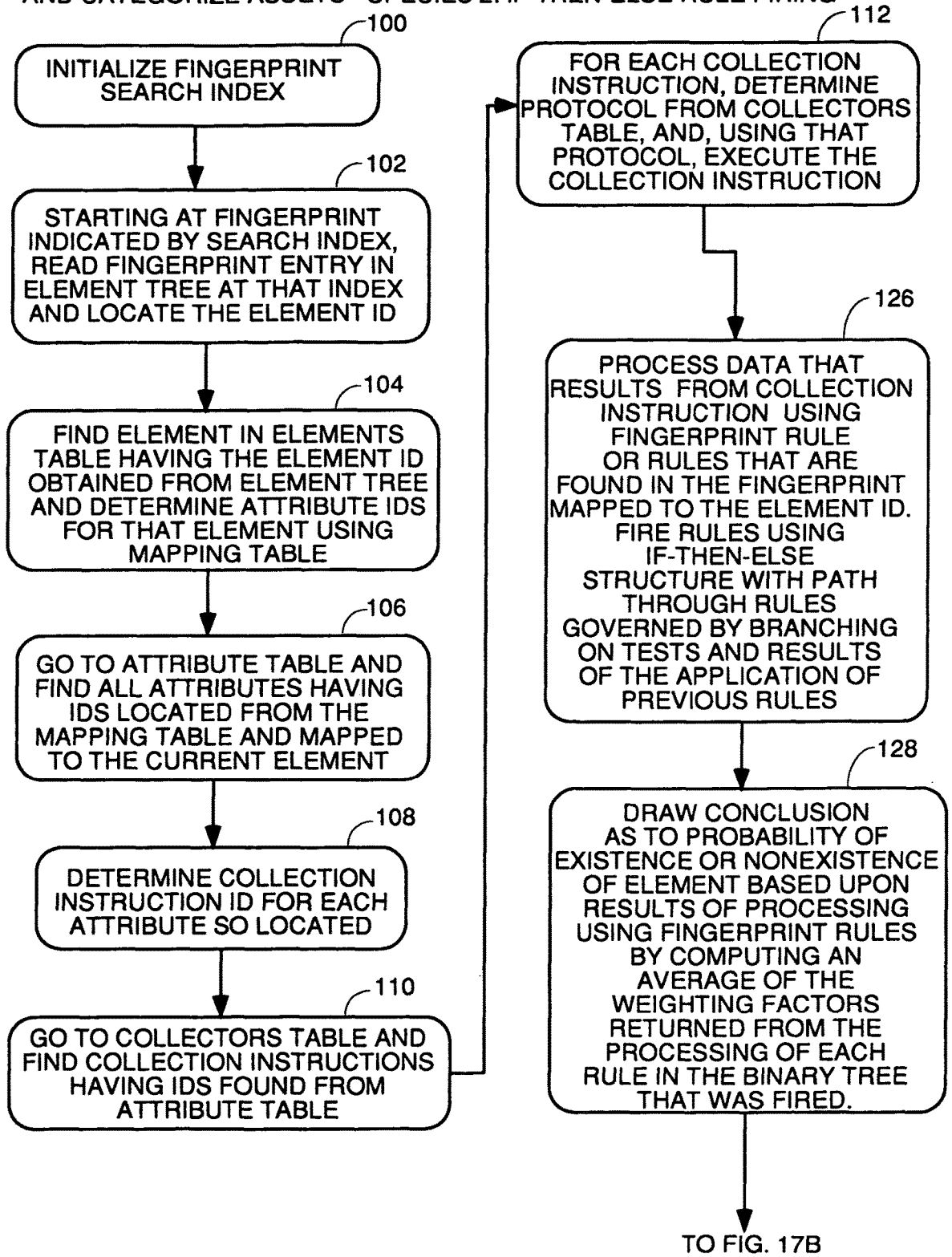
FIGS. 17A through 17B are a process to use fingerprints to automatically collect data using an if-then-else rule firing algorithm.
Figure 17B:
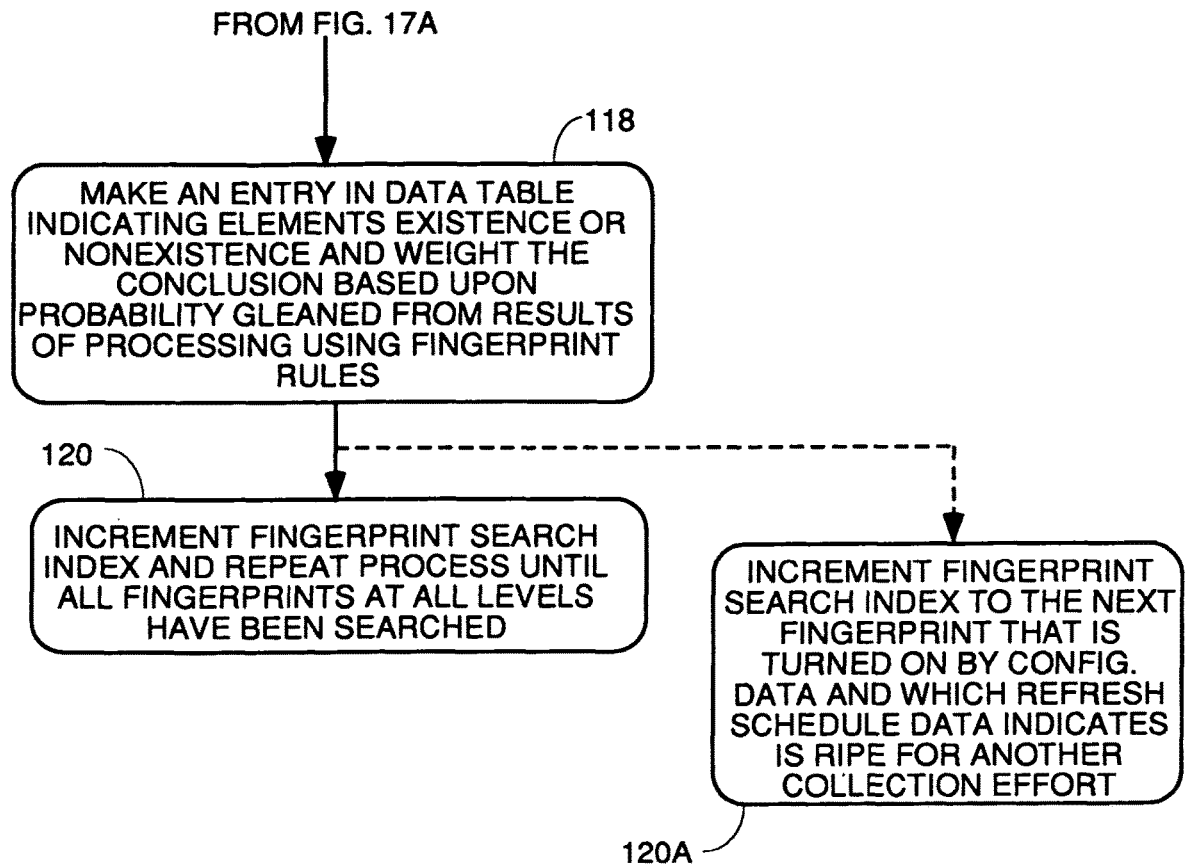

A second species represented by generic steps 114 and 116 in FIG. 15 is represented by the flowchart of FIGS. 17A and 17B. In this species, the fingerprint rules are fired in an IF-THEN-ELSE logical fashion in step 126. This means that if an element has multiple rules, the first rule will be applied to the collected attribute data, and then branching to either of two other rules will occur depending upon the results of application of the first rule to the gathered attribute data thereby defining a binary tree structure. The binary tree can have multiple levels. This selective branching based upon result can occur at every level of the tree. Step 128 represents the process of drawing a conclusion as to the probability of the existence or nonexistence of the element by computing an average of the weighting factors returned by whatever fingerprint rules in the binary tree that were fired. All other steps in the process are the same as in FIG. 15. The alternative species using configuration data to turn fingerprints on and off and refresh schedule data to control the interval between collection attempts of any fingerprints that are turned on is indicated by step 120A.

Figure 18A:
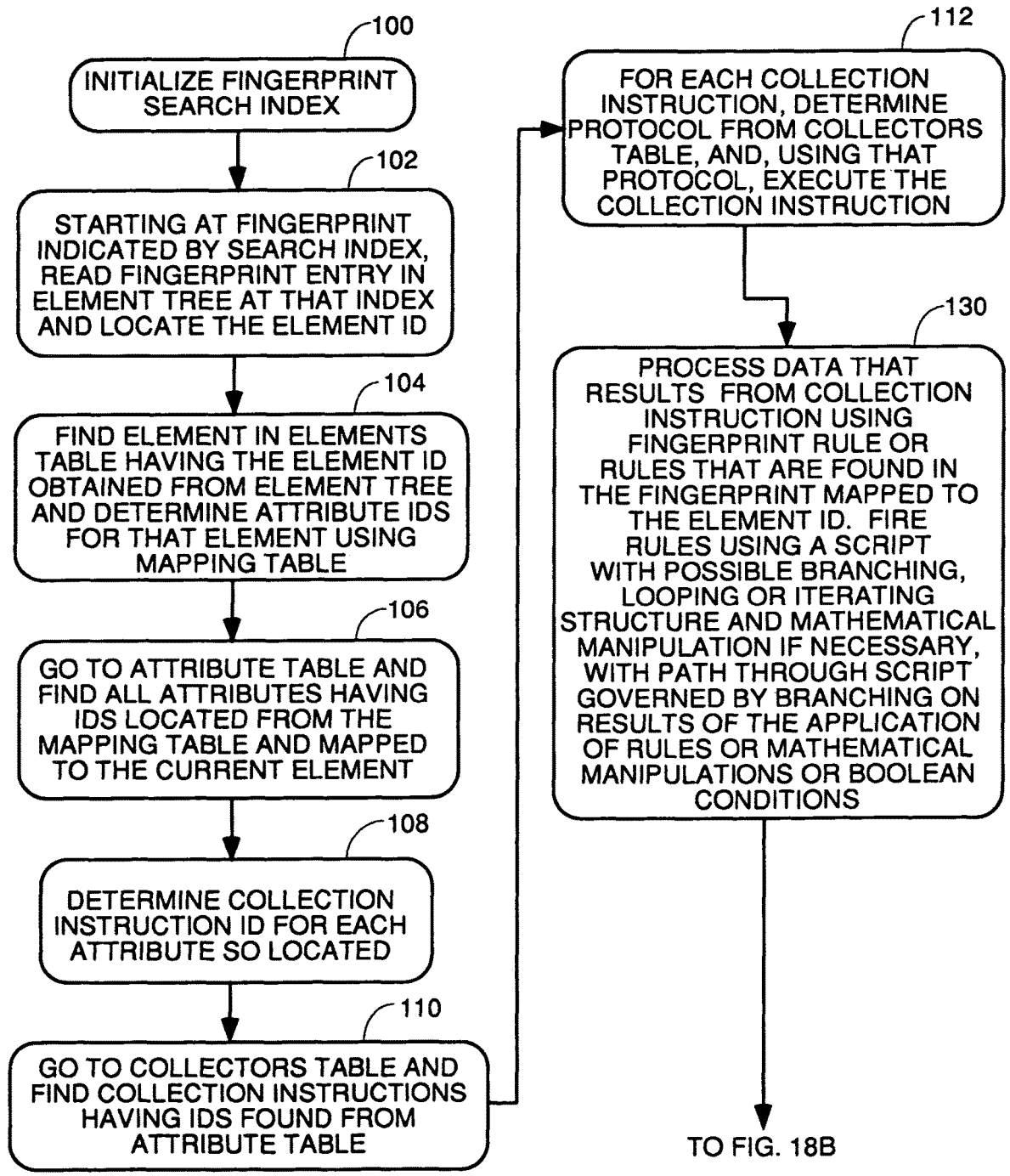
FIGS. 18A through 18B are a flowchart of a process to automatically collect data and categorize assets by firing rules and processing according to a script.
Figure 18B:
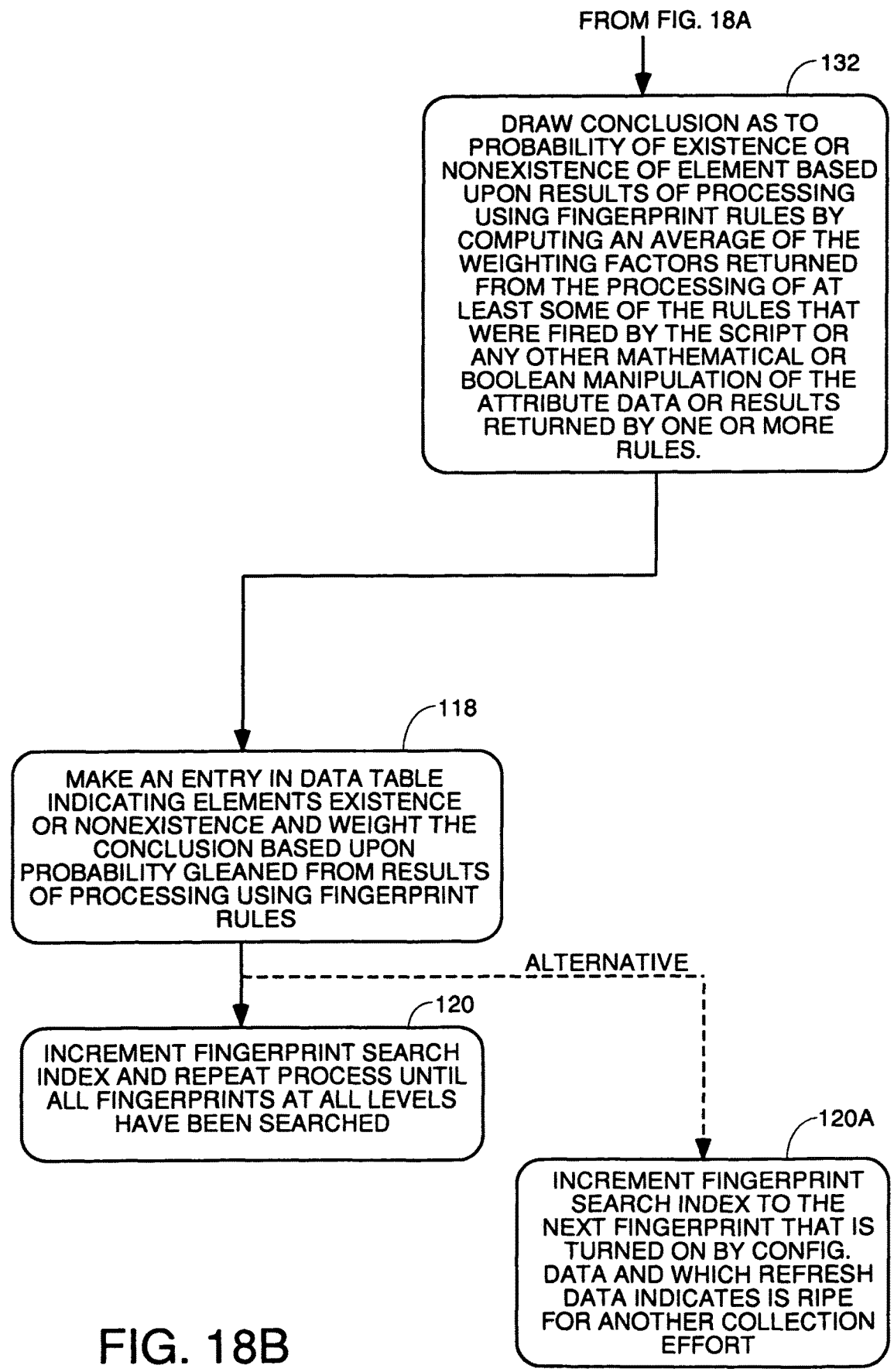

A third species represented by the generic steps 114 and 116 of FIG. 15 is represented by the flowchart of FIGS. 18A and 18B. This species uses a script such as a scripting language, initially Perl, to control the application of fingerprint rules to gathered attribute data, as represented by step 1. In this species, a script controls which rules are fired with branching or selection of the rules to be fired based upon the results of processing of other rules or mathematical manipulations of attribute data or mathematical manipulation of the results returned from the application of other fingerprint rules or upon Boolean conditions found in the attribute data or returned by the processing of other rules. The script can have looping, iteration, subroutines or any other known programming device and can any program structure and use any programming techniques required by the situation. Step 132 represents the process of drawing conclusions as to the probability of existence or nonexistence of a particular element. This can be done by computing an average of the weighting factors returned from the processing of at least some of the rules that were fired (or all of them) or by any other mathematical or Boolean manipulation of the attribute data and/or the results returned by application of one or more fingerprint rules. All other steps are the same as in FIG. 15. The alternative species using configuration data to turn fingerprints on and off and refresh schedule data to control the interval between collection attempts of any fingerprints that are turned on is indicated by step 120A.

Figure 19B:
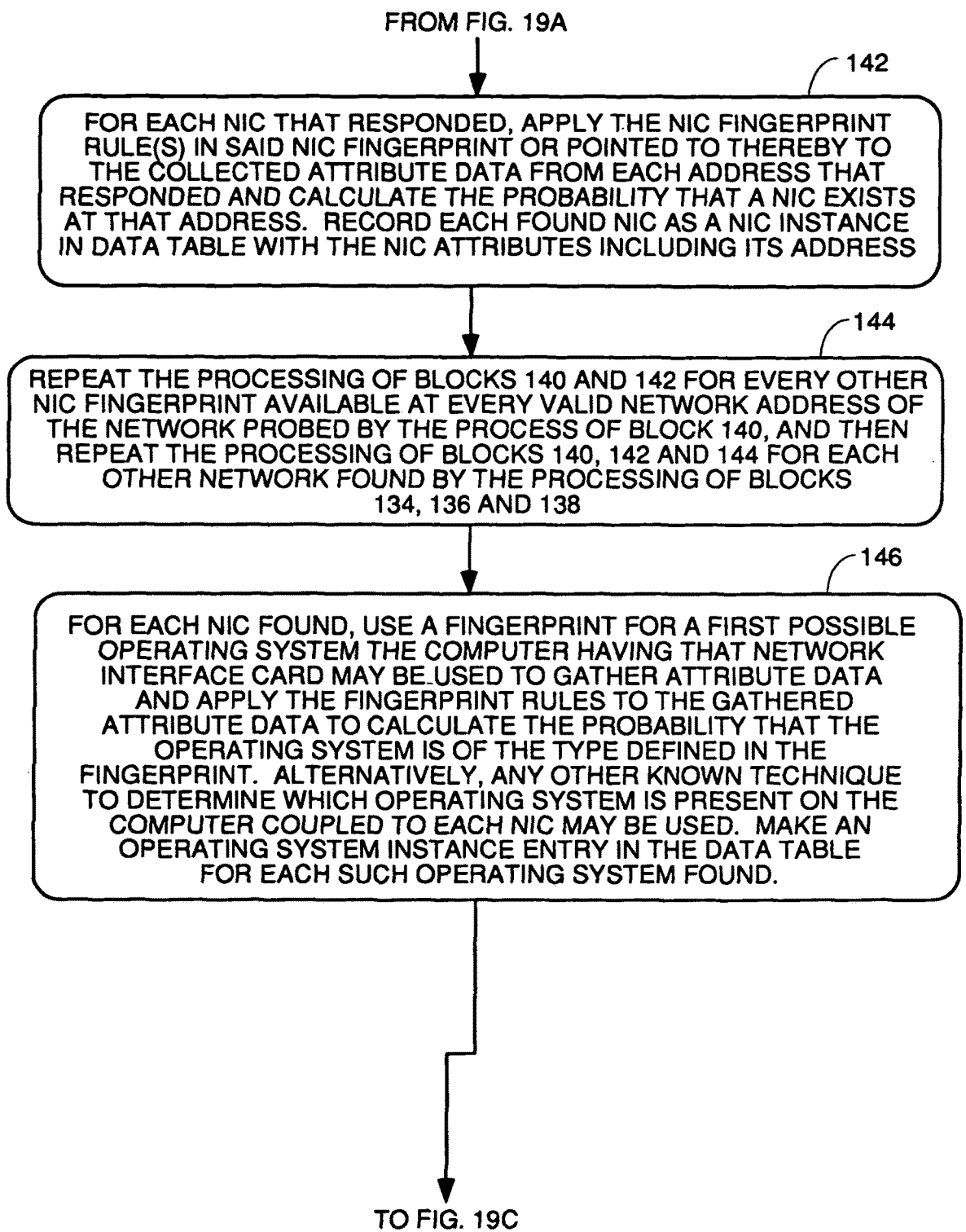

Referring to FIGS. 19A and 19B, there is shown an overview process diagram of an automated discovery process which allows the system of the invention to automatically discover and characterize the computer and software assets of a company or designated subset of computer and software assets without any prior knowledge of the networks or servers in a company. The process of FIGS. 19A and 19B uses fingerprints in a particular logical order selected to allow the assets of the company to be discovered without any pre knowledge about what or where those assets are. This allows automatic discovery of the existence of networks, which network addresses have network interface cards mapped thereto, the operating systems the computers having those network interface cards are executing and many different things that characterize each of the computers. Those things include, but are not limited to, the installed software, which software processes are in execution, CPU type, speed, memory, file system, etc.

FIGS. 19A and 19B represent the details of how to use fingerprints in a particular order to determine the assets in an organization, but the basic steps that define the genus of this automated discovery process are as follows. First, use one or more network fingerprints to determine the existence of one or more networks and gather data about them to determine the type and attributes of any discovered network and make an entry in the element and data tables. Second, using the valid addresses of each discovered network and one or more network interface card fingerprints, the system probes the discovered networks to discover all the network interface cards that exist on each discovered network and the attributes of each. Third, for each network interface card found, one or more fingerprints for the operating systems the process is capable of detecting are used to determine the operating system that is controlling each computer coupled to one of the found networks by one of the found network interface cards. An entry for each found operating system is then made in the element and data tables that record the type of operating system and its attributes. Fourth, for each found operating system, one or more fingerprints is used which define the attributes of one or more elements of interest and rules to process gathered attribute data to determine if an element exists and what it is. These fingerprints are used to gather attribute information about each element of interest via said operating system. Typically, this is done by invoking function calls of the operating system which, when executed, supply information about the existence and attributes of said one or more elements of interest. When the attribute data is gathered, an entry in a data table is made regarding each found element.

Figure 19C:
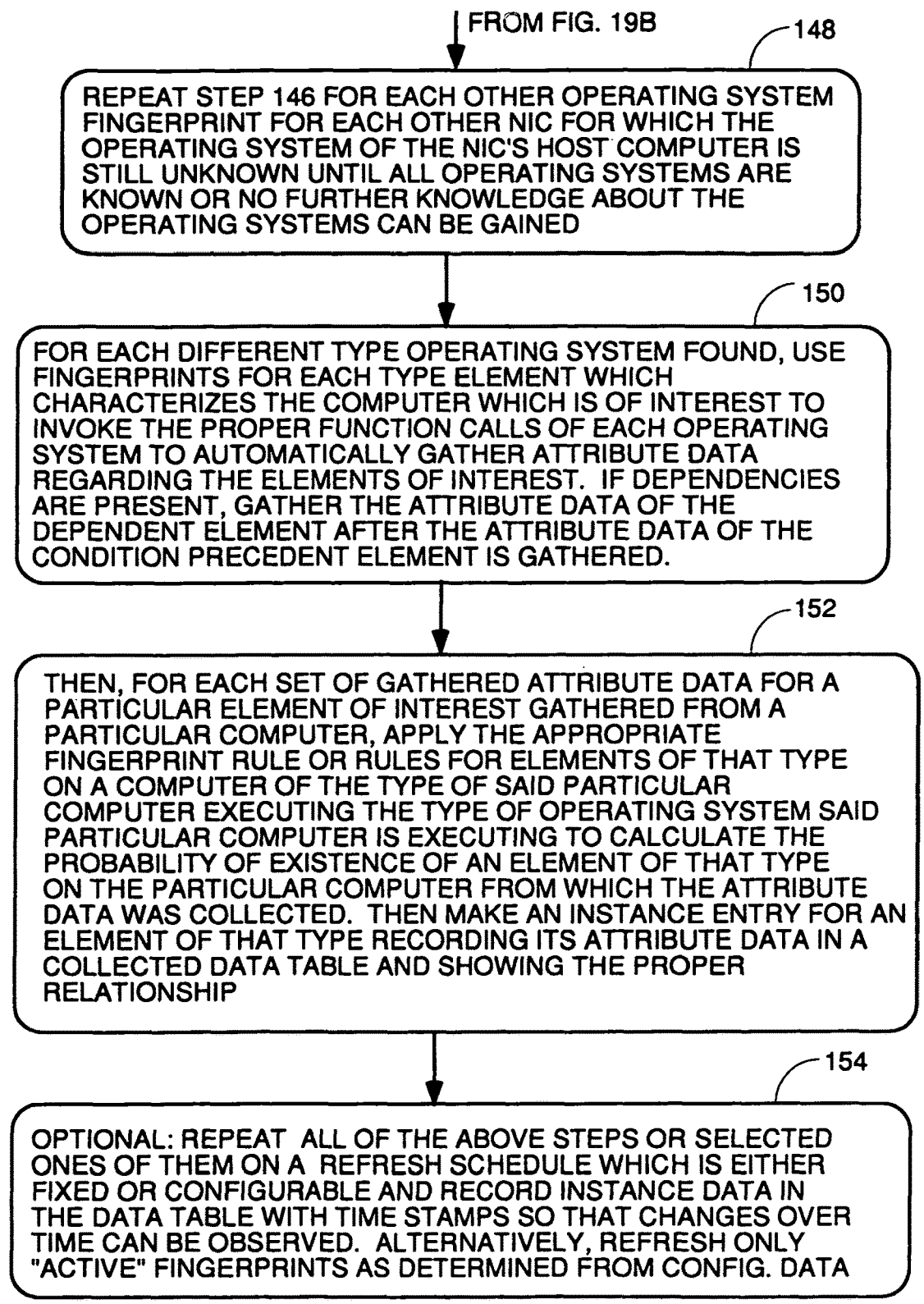

Turning to the exact details of the automated discovery process shown in FIGS. 19A through 19C, step 134 represents the step of starting with a fingerprints for one of the one or more different types of networks and executing collection instructions. These collection instructions are either in the network fingerprint or are found by following a pointer in the fingerprint to the collection instruction. The collection instruction automatically collects attribute data or at least attempts to do so. Sometimes the network will not respond to the collection attempts orchestrated by the fingerprint. That happens when the network fingerprint selected does not match the actual network in existence. This can happen when the type of network installed is unknown in the fully automatic process and a fingerprint is chosen at random from among all the network fingerprints available. In this case, the absence of attribute data will be recorded.

In the preferred embodiment, step 134 is accomplished by starting with one fingerprint for a potential network of a certain type and following a pointer in the network fingerprint to a collection instruction to gather attribute data for that type of network. The fingerprints corresponding to each element ID are stored in the table of FIG. 12. The collection instruction for each fingerprint is stored in the table of FIG. 13. The table of FIGS. 10A and 10B maps each element ID to the ID of a collector instruction and to the fingerprint for the element. Step 134 represents executing that collection instruction and gathering attribute data if possible.

In alternative embodiments, the existence of the networks and their attributes may be entered by hand in the collected data table since it is easy to do this.

In step 136, the rules in the network fingerprint used in step 134 are applied to the gathered attribute data, if any, to determine whether a network of the type defined by the network fingerprint exists. If so, the found network is recorded as a network instance in the elements table such as are illustrated in FIG. 5 or FIG. 14. The attributes of the found network including its top and bottom IP addresses are recorded in the collected data table. This has the effect of creating a map in the elements table of the networks that exist.

In step 138, the process of steps 134 and 136 is repeated using each of the other available network fingerprints to determine if any other networks are present, and, if so, to collect attribute data for these other networks.

For every network found, step 140 represents the process of selecting a fingerprint for one of the possible network interface cards (NICs) that may be coupled to the found network(s) to gather information about any NICs coupled to each network. This is done, on each network, by executing a collection instruction in the NIC fingerprint or pointed to by it for each of the network's valid addresses to attempt to contact a NIC at each address and gather attribute data about it. In the preferred embodiment, this is done by following a pointer in the fingerprint to the collection instruction. This phrase "following a pointer in the fingerprint to a collection instruction" or words to that effect includes using the element ID as a pointer in the fingerprint table to the fingerprint and also as a pointer to the collection instruction for that fingerprint in the collectors table of FIG. 13. The collection instruction is performed once for each valid address of each network. This constitutes an attempt to contact a NIC at that address in a language it understands.

As symbolized by step 144, this execution of a collection instruction is done at every address on the network being processed for which the NIC type is unknown using every NIC fingerprint until one of the fingerprints works or one runs out of NIC fingerprints and a conclusion can be drawn. That conclusion is that either there is no NIC at that address or it is not a type of NIC for which a fingerprint has been defined. Once a NIC has been found at a particular address, no further fingerprints need be used on that address, and processing can move to the next address until all addresses of the network have been processed. Then, as represented by step 144, all the addresses of all the other known networks are similarly processed to find the NICs assigned thereto or draw the conclusion that no NIC at all or a foreign NIC for which there is no fingerprint is assigned to certain addresses.

Once the NIC fingerprint that works, if any, is found, the collection instructions pointed to by that NIC fingerprint are used to gather attribute data about the NIC at that address. This process is repeated at each address upon which a NIC is found. In other words, as symbolized by steps 144, this attribute data collecting process is repeated at every valid address of every network to find all the NICs. The whole process can be done one network at a time or in parallel using multiple data collector processes working simultaneously.

Step 142 represents the process wherein the rule or rules in the NIC fingerprint currently being processed are applied to the gathered attribute data to calculate the probability that a NIC instance exists at the address being processed. For each found NIC, a NIC element instance with all the attributes of the NIC is recorded in the elements and collected data tables. As symbolized by step 144, the process of applying the appropriate NIC fingerprint rules to attribute data collected for each address which responds, is repeated for every address of every network until all NICs are found.

For each NIC that is found, processing represented by step 146 determines what type of operating system the device having the NIC is executing. This can be done in several known ways such as by sending a specific type of network packet to the unknown machine at the network address. This network packet has a defined or undefined response packet. Each operating system deals with arrival of such a packet differently. By examining the response packet, it is possible to determine which type of operating system the unknown machine is running.

Alternatively, the fingerprint for each different possible type of operating system and version can be used to point to a collection instruction list which controls a data collector process to attempt to invoke a particular function call of a programmatic interface (API), a service, utility, or program of the operating system. Each operating system has a different set of APIs, services, utilities and programs. If the operating system responds to the attempt to invoke a particular function call of an API for a known type of operating system, then the operating system must be of that type since all other operating systems would not respond or would respond in a different or unexpected manner. Thus, by trial and error elimination, the type of operating system can be determined using fingerprints in one of the species represented by step 146.

Once the type of operating system is determined, the proper fingerprint for that type operating system can be used to gather more attribute data that defines the operating system itself, and the appropriate operating system fingerprint rules can be applied to the gathered attribute data to calculate the probability that the operating system exists and is of the type the fingerprint being used defines, as symbolized by step 146.

Once the operating system type has been determined and its attribute data gathered, an operating system instance entry is made in the element table to indicate that device X is running operating system Y where X is the particular device host name and Y is the type of operating system, as symbolized by step 146.

Then, step 146 is repeated for every NIC that responded to determine the operating system of every computer on the network, as symbolized by step 148.

Now that the operating system is known for every device on all the networks (unless a rogue operating system or version of an operating system with no fingerprint is present), many different things of interest about each device can be determined by invoking the proper function calls of various APIs, services, utilities, or programs of the operating system. These things include but are not limited to: whether it is a web server; who its superuser is; the superuser password; how much memory it has; what type CPU it has and the speed thereof; what type of file system(s) it has and which file system is mounted; the files that are in the file system; what software packages are installed on the computer; and, which software processes are in execution at any particular time. Assuming there is a fingerprint for each of these things and there is a way to obtain this data about each device, each of these things may be determined by using a fingerprint for an element of that type.

The fingerprints for these other elements of interest can be used in any order, but sometimes there are dependencies built into the fingerprints. This means that attribute data about one element cannot be gathered until the attributes of another fingerprint have been gathered. For example, sometimes attribute data about a child element cannot be gathered until the attribute data for a parent element has been gathered. If an element has a dependency, in the preferred embodiment, this fact will cause its attributes to not be gathered if the element upon which it is dependent has not had its attributes gathered. However, in the preferred embodiment, there is a refresh table which governs the frequency at which each fingerprint is used, so if the element with the dependency has had its dependency condition satisfied the next time the fingerprint for the element is scheduled to be used, the attributes will be gathered at that time. In alternative embodiments, whenever the parent element, or whatever other element is a condition precedent to gathering the attributes of the element in question, has its attributes gathered, that will automatically trigger gathering of attributes of all other elements which are dependent upon it.

The fingerprint that is used to determine each element may be, and usually is, unique to the particular type of operating system. For example, the fingerprint to determine CPU type and CPU speed is usually different as between an IBM server running AIX and a Sun server running Solaris 2.7. This is because at least the collection instructions are different. However, collection instructions may be shared between different fingerprints for the same element to be gathered from different operating systems or different versions of the same operating system. For example, if the function call that needs to be invoked to determine the amount of memory is the same on an HP UNIX machine and a Sun Solaris 2.7 machine, the memory fingerprint collection instruction for these two different type machines can be identical.

Step 150 represents the process of running the various fingerprints for the different things about the machine that are of interest once the operating system type is known. Step 150 represents this process generically, and the different species mentioned above to handle dependencies are all symbolized by step 150. To gather attribute data, the collection instruction associated with each fingerprint is executed and attribute data is collected about each element. An entry is then made in the collected data table for each element that includes the elements attributes data and, in some embodiments, the probability or confidence level that it exists. In some embodiments, the instance entry in the element table is only made for elements where the probability or confidence level is above a certain level, which can be configurable in some embodiments. Step 152 represents this processing.

The instance entry in the element table is entered in such a way to show the relationship to any parent elements or supersystems of which the element is a subsystem. For example, referring to FIG. 7, the NIC entry on line 129 is shown as indented to indicated there is some data structure to indicate that this NIC is coupled to the network corresponding to the data entry on line 127. Likewise, the data entry on line 131 indicates that the computer owning the NIC corresponding to the data entry on line 129 is running a Solaris 2.7 operating system. Likewise, the data entries on lines 133, 135 and 137 all are structured to indicate they are elements of the computer running the Solaris 2.7 operating system memorialized on line 131 and coupled to the network memorialized on line 127 by the NIC memorialized on line 129.

Step 154 represents the alternative embodiments of the process where all the steps 134 to 152 are repeated at a frequency defined by a refresh interval which is either fixed or configurable and wherein each entry for an element in the collected data table is time stamped so the changes in the attribute data for each element over time can be observed. Step 154 also represents the alternative embodiments where each fingerprint has its own configurable or fixed refresh schedule. Step 154 also represents the alternative embodiments wherein prior to using any fingerprint, configuration data is checked to make sure the fingerprint is "active" and only using the fingerprints that are marked as "active" to collect and analyze data.

In some embodiments, the discovery process of FIG. 19 will be performed completely the first time to discover all or a designated subset of networks, NICs, operating systems and all the other elements then existing in the system. After that is done, the fingerprints marked as active by configuration data may used repeatedly according to refresh schedule data in a refresh table and collection calendar. Fingerprints may applied as the result of a user action. Collected attribute data is then analyzed with the fingerprint rules, and entries are made in the collected data table having timestamps so that how attribute data changes over time can be observed.

Although the invention has been disclosed in terms of the preferred and alternative embodiments disclosed herein, those skilled in the art will appreciate that modifications and improvements may be made without departing from the scope of the invention. All such modifications are intended to be included within the scope of the claims appended hereto.

What is claimed is:

1. A non-transitory computer-readable storage medium having stored thereon computer-readable instructions which, when executed, control a computer to perform a method for gathering attribute data about elements, the method comprising:
   generating a plurality of element data structures recognizable by a computer system, the plurality of element data structures corresponding to installed software on the computer system;
   generating, based on a plurality of fingerprint files, a plurality of collection instructions associated with each element data structure for retrieving attribute data for the element data structure within the computer system, wherein each collection instruction is referenced in a respective fingerprint file specific to a type associated with the element data structure, the fingerprint file indicating attributes of the element data structure;
   collecting attribute data using the collection instructions generated based on the fingerprint files, wherein the collected attribute data is stored in a single common data store after post-processing to conform the collected attribute data to the element data structure;
   examining the stored attribute data to determine that an element exists within the computer system, wherein the examination includes matching the stored attribute data with attribute definitions of known elements;
   generating entries for each matched element, wherein each matched element comprises collected attribute data that matches with attribute definitions of known elements; and
   characterizing features of the computer system based on the matched elements found on the computer system from the generated entries.

2. The computer-readable storage medium of claim 1, wherein the collected attribute data about the elements collected using the collection instruction includes a timestamp indicating when the attribute data was collected.

3. The computer-readable storage medium of claim 1, wherein the collecting of attribute data about elements using the collection instructions is performed according to a refresh schedule which indicates when selected ones or all of the attribute data can be collected.

4. The computer-readable storage medium of claim 1, wherein the collecting of attribute data about elements using the collection instructions is performed according to a refresh schedule, wherein the refresh schedule includes a separate refresh schedule for each individual attribute data.

5. The computer-readable storage medium of claim 4, wherein the refresh schedule further includes separate refresh schedules for individual classes of attribute data.

6. The computer-readable storage medium of claim 1, wherein the collecting of attribute data about elements using the collection instructions is performed according to a collection calendar that controls a time, day and date individual items of attribute data is collected.

7. The computer-readable storage medium of claim 6, wherein the collection calendar further controls a time, day and date individual classes of attribute data are collected.

8. The computer-readable storage medium of claim 1, wherein the method further comprises:
   storing the collected attribute data about elements in a collected data table,
   selecting an attribute from the collected data table, wherein the selection is based on a correlation index that specifies what attributes are to be selected, and
   storing the selected attributes in particular locations in a correlation table data structured based on the correlation index that specifies how the selected attribute will be displayed with respect to relationships between different attribute data over time.

9. The computer-readable storage medium of claim 8, wherein the correlation index is provided by a user and is stored with the plurality of element data structures associated with the element.

10. The computer-readable storage medium of claim 1, wherein the method further defines collection instructions as a program, script or list of instructions, wherein the collection instructions gather attribute data of a specific attribute for a specific element.

11. The computer-readable storage medium of claim 10, wherein the collection instructions gather attribute data associated with a group of elements.

12. The computer-readable storage medium of claim 10, wherein the collection instructions gather attribute data of a specific attribute for a specific asset.

13. The computer-readable storage medium of claim 1, wherein the stored plurality of collection instructions in each element data structure is also directed towards retrieving a pointer to a collection instruction capable of retrieving attribute data of that type.

14. The computer-readable storage medium of claim 1, wherein the features including one or more of operating system, CPU type, processing speed, or memory.

15. The computer-readable storage medium of claim 1, wherein each fingerprint file is associated with an order, and wherein attribute data is collected based on the order.

* * * * *